(12) United States Patent
Takeuchi

(10) Patent No.: US 7,528,583 B2
(45) Date of Patent: May 5, 2009

(54) BRUSHLESS GENERATOR

(75) Inventor: Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 60 days.

(21) Appl. No.: 11/897,933

(22) Filed: Aug. 31, 2007

(65) Prior Publication Data

US 2008/0054859 A1    Mar. 6, 2008

(30) Foreign Application Priority Data

Sep. 5, 2006   (JP) .............................. 2006-240416
Aug. 30, 2007  (JP) .............................. 2007-223707

(51) Int. Cl.
*H02P 11/00*  (2006.01)
*H02P 9/00*   (2006.01)
*H02H 7/06*   (2006.01)
*H02P 3/18*   (2006.01)
*H02P 29/04*  (2006.01)
*H02P 23/00*  (2006.01)
*H02P 25/00*  (2006.01)
*H02P 27/00*  (2006.01)

(52) U.S. Cl. .......................... 322/24; 318/757; 318/798
(58) Field of Classification Search .................. 322/24; 318/757, 798
See application file for complete search history.

(56) References Cited

U.S. PATENT DOCUMENTS

| | | | | |
|---|---|---|---|---|
| 4,426,610 A | * | 1/1984 | Kawada et al. ............... | 318/798 |
| 4,434,393 A | * | 2/1984 | Kobari et al. ............... | 318/757 |
| 4,542,324 A | * | 9/1985 | Leuthen ...................... | 318/798 |
| 5,041,769 A | * | 8/1991 | Iwai ...................... | 318/400.03 |
| 5,124,625 A | * | 6/1992 | Wakabayashi ............... | 318/603 |
| 6,455,969 B1 | * | 9/2002 | Chen ......................... | 310/114 |
| 6,690,127 B2 | * | 2/2004 | Birkestrand et al. ......... | 318/139 |
| 7,095,155 B2 | * | 8/2006 | Takeuchi .................... | 310/266 |
| 7,211,974 B2 | * | 5/2007 | Takeuchi .................... | 318/280 |
| 7,245,051 B2 | * | 7/2007 | Hosono et al. ............. | 310/68 B |
| 7,270,015 B1 | * | 9/2007 | Feller ...................... | 73/861.95 |
| 2003/0182975 A1 | * | 10/2003 | Tomigashi et al. ......... | 68/12.04 |
| 2003/0227287 A1 | * | 12/2003 | Hori et al. ............... | 324/207.25 |
| 2005/0200213 A1 | * | 9/2005 | Takeuchi ................... | 310/68 B |
| 2006/0028751 A1 | * | 2/2006 | Takeuchi .................... | 360/55 |
| 2007/0188121 A1 | * | 8/2007 | Takeuchi .................... | 318/280 |
| 2008/0246423 A1 | * | 10/2008 | TAKEUCHI ............... | 318/376 |

FOREIGN PATENT DOCUMENTS

JP      2001-298982      10/2001

* cited by examiner

*Primary Examiner*—Nicholas Ponomarenko
*Assistant Examiner*—Pedro J Cuevas
(74) *Attorney, Agent, or Firm*—Harness, Dickey & Pierce, P.L.C.

(57) ABSTRACT

In the m phase brushless generator, n (n<m) phase magnet coil groups are provided with magnetic sensors, while the remaining (m−n) phase magnet coil groups are not provided with magnetic sensors. The regeneration control circuit utilizes the sensor outputs of the n magnetic sensors to generates n sets of regeneration control signals for the n phase magnet coil groups. The regeneration control circuit further generates (m−n) sets of regeneration control signals for the (m−n) phase magnet coil groups not associated with the n magnetic sensors, using one or more of the sensor outputs of the n magnetic sensors in generation of each of the (m−n) sets of regeneration control signals.

8 Claims, 21 Drawing Sheets

Phase = 0 or 2π

Phase = π/2

Phase = π

Phase = 3π/2

Sensor outputs SSA,SSB

Simulated Phase C sensor signal SSC

Sensor outputs SSA,SSB

Simulated Phase C sensor signal SSC $Y = a \cdot X + b$
or
$Y = a(X + b)$

Generation of simulated Phase C sensor signal SSC

| Angle | SSA | SSB | SSC |
|---|---|---|---|
| | $\sin(\theta)$ | $\sin(\theta+120)$ | $\sin(\theta+240)$ |
| $\theta°$ | 0 | 120 | 240 |
| 0 | 2.50 | 4.67 | 0.33 |
| 10 | 2.93 | 4.42 | 0.15 |
| 20 | 3.36 | 4.11 | 0.04 |
| 30 | 3.75 | 3.75 | 0.00 |
| 40 | 4.11 | 3.36 | 0.04 |
| 50 | 4.42 | 2.93 | 0.15 |
| 60 | 4.67 | 2.50 | 0.33 |
| 70 | 4.85 | 2.07 | 0.58 |
| 80 | 4.96 | 1.64 | 0.89 |
| 90 | 5.00 | 1.25 | 1.25 |
| 100 | 4.96 | 0.89 | 1.64 |
| 110 | 4.85 | 0.58 | 2.07 |
| 120 | 4.67 | 0.33 | 2.50 |
| 130 | 4.42 | 0.15 | 2.93 |
| 140 | 4.11 | 0.04 | 3.36 |
| 150 | 3.75 | 0.00 | 3.75 |
| 160 | 3.36 | 0.04 | 4.11 |
| 170 | 2.93 | 0.15 | 4.42 |
| 180 | 2.50 | 0.33 | 4.67 |
| 190 | 2.07 | 0.58 | 4.85 |
| 200 | 1.64 | 0.89 | 4.96 |
| 210 | 1.25 | 1.25 | 5.00 |
| 220 | 0.89 | 1.64 | 4.96 |
| 230 | 0.58 | 2.07 | 4.85 |
| 240 | 0.33 | 2.50 | 4.67 |
| 250 | 0.15 | 2.93 | 4.42 |
| 260 | 0.04 | 3.36 | 4.11 |
| 270 | 0.00 | 3.75 | 3.75 |
| 280 | 0.04 | 4.11 | 3.36 |
| 290 | 0.15 | 4.42 | 2.93 |
| 300 | 0.33 | 4.67 | 2.50 |
| 310 | 0.58 | 4.85 | 2.07 |
| 320 | 0.89 | 4.96 | 1.64 |
| 330 | 1.25 | 5.00 | 1.25 |
| 340 | 1.64 | 4.96 | 0.89 |
| 350 | 2.07 | 4.85 | 0.58 |
| 360 | 2.50 | 4.67 | 0.33 |

$$SSC = -(SSB - \frac{VDD}{2}) - (SSA - \frac{VDD}{2}) + \frac{VDD}{2}$$
$$= -SSB - SSA + \frac{3}{2}VDD$$

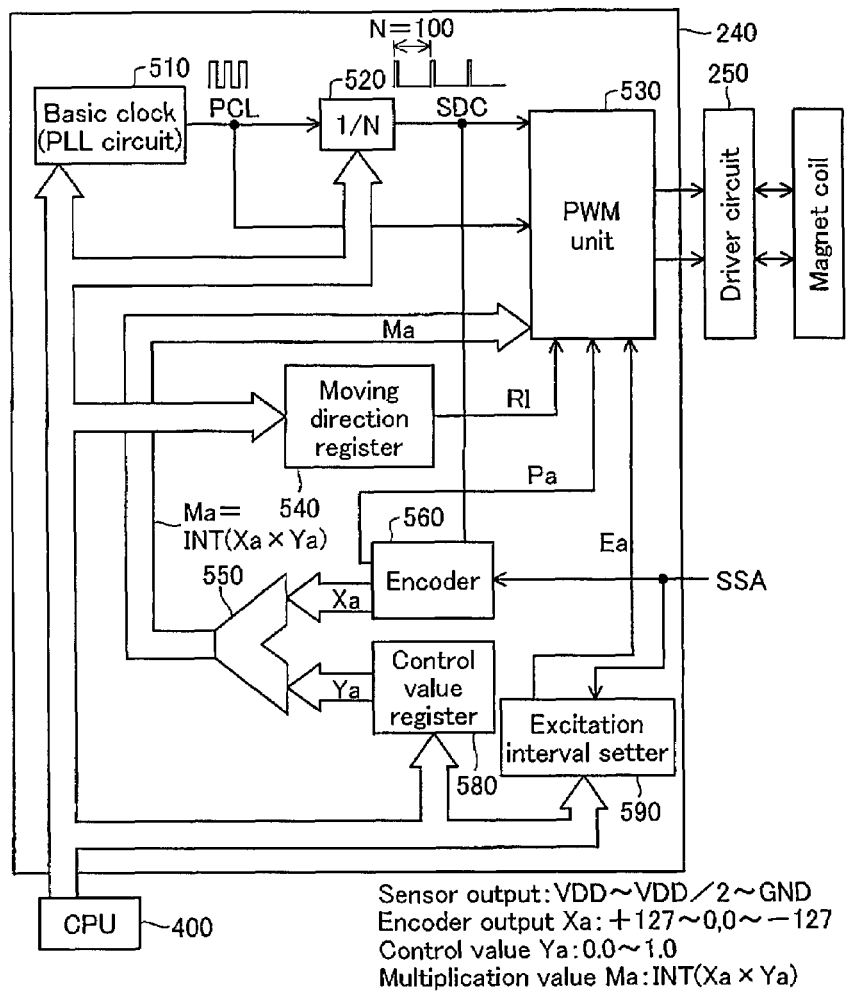

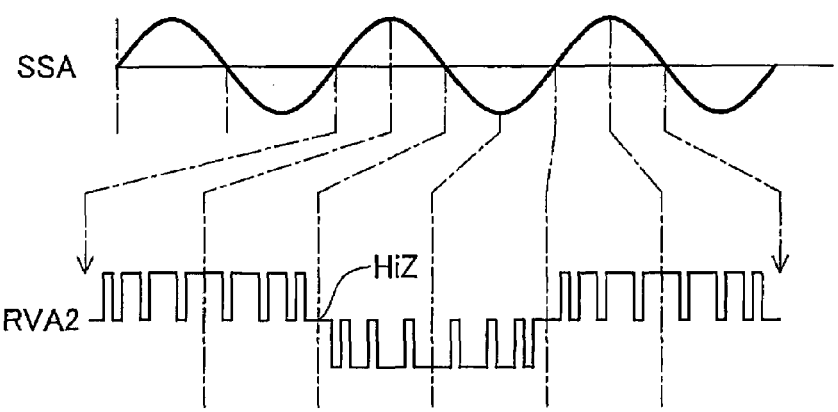
Fig.10A SSA
Fig.10B DRVA1+DRVA2 — HiZ
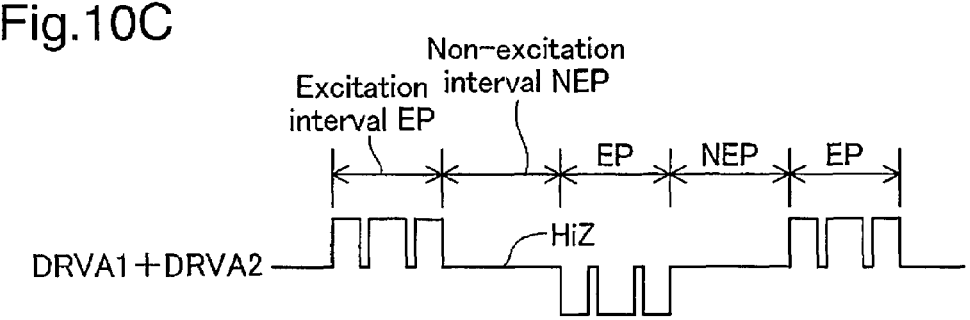
Fig.10C
Excitation interval EP
Non-excitation interval NEP
DRVA1+DRVA2 — HiZ

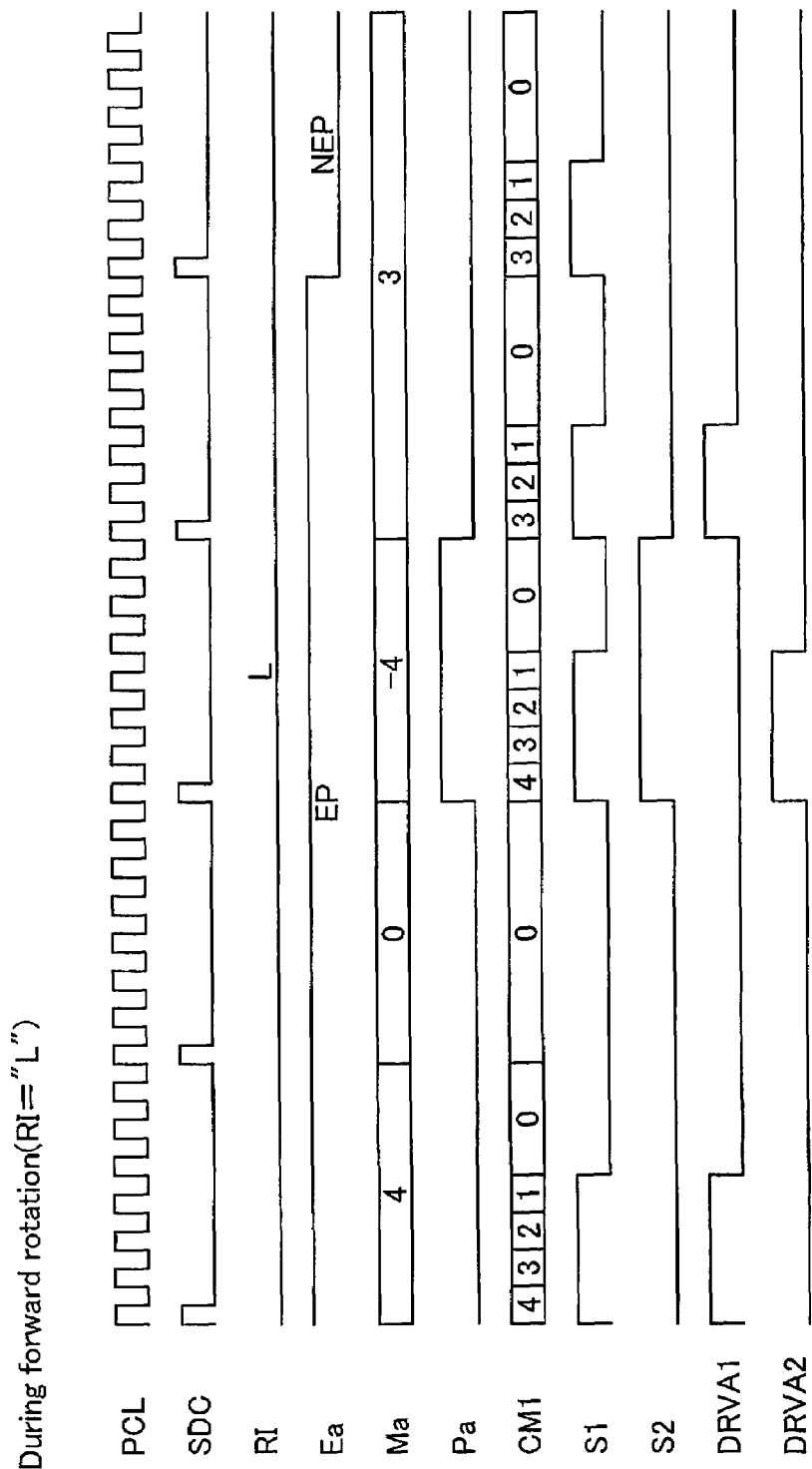

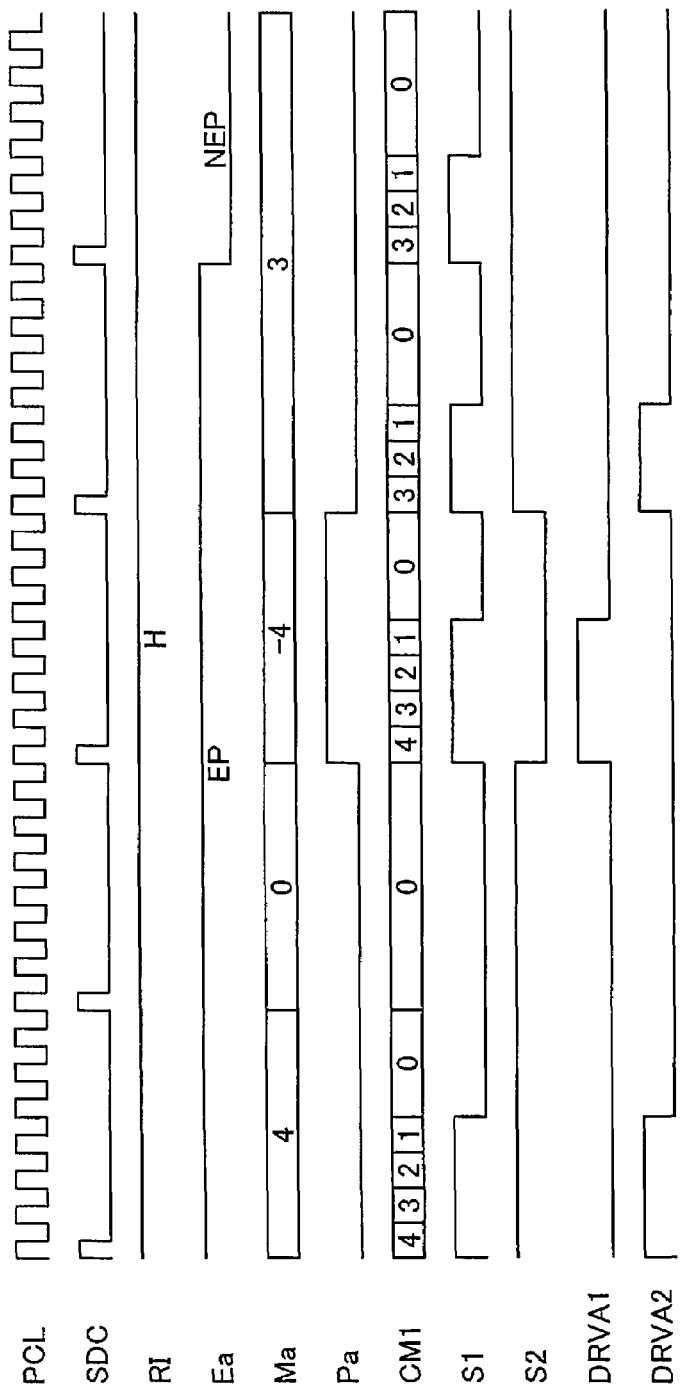

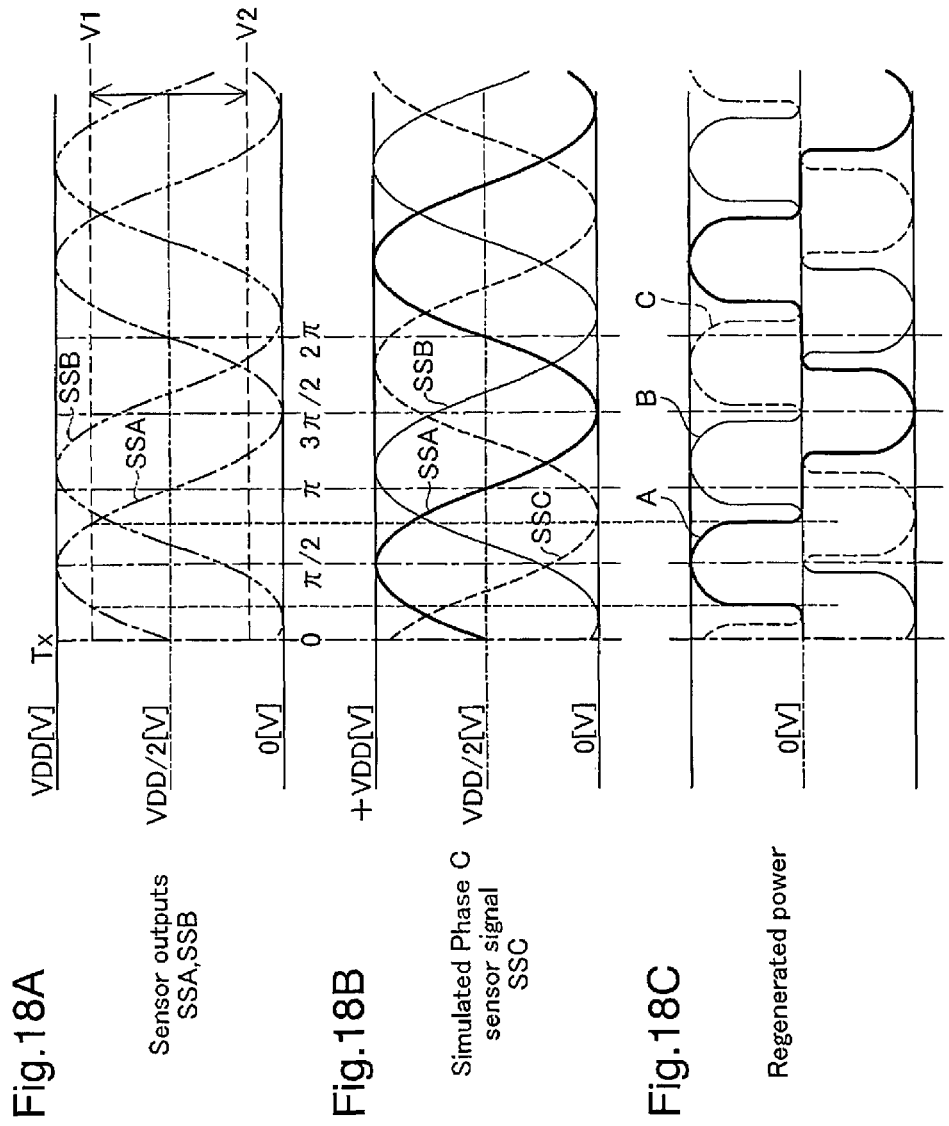

| Angle $\theta°$ | SSA Sin($\theta$) 0 | SSB Sin($\theta$+90) 90 | SSC Sin($\theta$+180) 180 | SSD Sin($\theta$+270) 270 |
|---|---|---|---|---|
| 0 | 2.50 | 5.00 | 2.50 | 0.00 |
| 10 | 2.93 | 4.96 | 2.07 | 0.04 |
| 20 | 3.36 | 4.85 | 1.64 | 0.15 |
| 30 | 3.75 | 4.67 | 1.25 | 0.33 |
| 40 | 4.11 | 4.42 | 0.89 | 0.58 |
| 50 | 4.42 | 4.11 | 0.58 | 0.89 |
| 60 | 4.67 | 3.75 | 0.33 | 1.25 |
| 70 | 4.85 | 3.36 | 0.15 | 1.64 |
| 80 | 4.96 | 2.93 | 0.04 | 2.07 |
| 90 | 5.00 | 2.50 | 0.00 | 2.50 |
| 100 | 4.96 | 2.07 | 0.04 | 2.93 |
| 110 | 4.85 | 1.64 | 0.15 | 3.36 |
| 120 | 4.67 | 1.25 | 0.33 | 3.75 |
| 130 | 4.42 | 0.89 | 0.58 | 4.11 |
| 140 | 4.11 | 0.58 | 0.89 | 4.42 |
| 150 | 3.75 | 0.33 | 1.25 | 4.67 |
| 160 | 3.36 | 0.15 | 1.64 | 4.85 |
| 170 | 2.93 | 0.04 | 2.07 | 4.96 |
| 180 | 2.50 | 0.00 | 2.50 | 5.00 |
| 190 | 2.07 | 0.04 | 2.93 | 4.96 |
| 200 | 1.64 | 0.15 | 3.36 | 4.85 |
| 210 | 1.25 | 0.33 | 3.75 | 4.67 |
| 220 | 0.89 | 0.58 | 4.11 | 4.42 |
| 230 | 0.58 | 0.89 | 4.42 | 4.11 |
| 240 | 0.33 | 1.25 | 4.67 | 3.75 |
| 250 | 0.15 | 1.64 | 4.85 | 3.36 |
| 260 | 0.04 | 2.07 | 4.96 | 2.93 |
| 270 | 0.00 | 2.50 | 5.00 | 2.50 |
| 280 | 0.04 | 2.93 | 4.96 | 2.07 |
| 290 | 0.15 | 3.36 | 4.85 | 1.64 |
| 300 | 0.33 | 3.75 | 4.67 | 1.25 |
| 310 | 0.58 | 4.11 | 4.42 | 0.89 |
| 320 | 0.89 | 4.42 | 4.11 | 0.58 |
| 330 | 1.25 | 4.67 | 3.75 | 0.33 |
| 340 | 1.64 | 4.85 | 3.36 | 0.15 |
| 350 | 2.07 | 4.96 | 2.93 | 0.04 |
| 360 | 2.50 | 5.00 | 2.50 | 0.00 |

$$SSC = -(SSA - \frac{VDD}{2}) + \frac{VDD}{2}$$
$$= -SSA + VDD$$
$$SSD = -(SSB - \frac{VDD}{2}) + \frac{VDD}{2}$$
$$= -SSB + VDD$$

BRUSHLESS GENERATOR

CROSS-REFERENCE TO RELATED APPLICATIONS

The present application claims the priority based on Japanese Patent Applications No. 2006-240416 filed on Sep. 5, 2006, and No. 2007-223707 filed on Aug. 30, 2007, the disclosures of which are hereby incorporated by reference in its entirety.

BACKGROUND OF THE INVENTION

1. Field of the Invention

This invention relates to control technology for a brushless generator.

2. Description of the Related Art

A brushless generator is a generator that utilizes a brushless motor structure. Brushless motors known in the art include that disclosed in JP2001-298982A, for example.

In this prior art brushless motor, control is carried out using on/off signals from digital magnetic sensors. Specifically, the timing for reversing the polarity of the voltage applied to the magnet coils is determined using the on/off signals from the digital magnetic sensors.

A conventional brushless motor is typically furnished with a number m of sensors corresponding to m phase coil groups, with the drive signal of each phase coil group generated by a dedicated sensor for each phase. However, it has been found that since errors and variations are present in the sensor output of the sensors, if the drive signal for each phase is generated by a dedicated sensor for the phase, the drive signals for each of the phases may develop improper phasing, resulting in lower efficiency of the motor.

Such problems are not limited to drive signals for driving brushless motors, but they are problems common to regeneration control signals for controlling power regeneration in brushless generators.

SUMMARY OF THE INVENTION

An object of the present invention is to provide technology that affords better phasing of the regeneration control signals for the phases in a brushless generator.

According to one aspect of the present invention, a brushless generator comprises: a coil array having m phase magnet coil groups, where m is an integer equal to 3 or greater; a magnet array having a plurality of permanent magnets; n magnetic sensors associated with n phase magnet coil groups among the m phase magnet coil groups, where n is an integer equal to 2 or greater but less than m, wherein the n magnetic sensors are used for detecting relative position of the magnet array and the coil array; and a regeneration control circuit that utilizes the sensor outputs of the n magnetic sensors to regenerate power from the coil array. The regeneration control circuit includes: a rectifier circuit for regenerating power from the coil array; and a regeneration control signal generator for generating a regeneration control signal that controls the rectifier circuit. The regeneration control signal generator generates n sets of regeneration control signals for the n phase magnet coil groups associated with the n magnetic sensors using the respective sensor outputs of the n magnetic sensors. The regeneration control signal generator further generates (m−n) sets of regeneration control signals for the (m−n) phase magnet coil groups not associated with the n magnetic sensors, using one or more of the sensor outputs of the n magnetic sensors in generation of each of the (m−n) sets of regeneration control signals.

According to this brushless generator, m sets of regeneration control signals are generated using n magnetic sensors outputs (n<m), whereby better phasing of the regeneration control signals for each of the phases is possible even where there is error or deviation in the sensor outputs of the sensors. As a result, regeneration of power can be carried out with better efficiency.

It is possible for the present invention to be reduced to practice in various ways, for example, a brushless generator, a brushless motor, a method for controlling (or method for driving) the same, a control circuit or a driving circuit, an actuator employing these, a moving body employing these and so on.

BRIEF DESCRIPTION OF THE DRAWINGS

FIGS. 9A through 9E depict the internal configuration and operation of a drive signal generator;

FIGS. 10A through 10C depict correspondence relationships between sensor output waveforms and drive signal waveforms;

FIG. 12 is a timing chart depicting operation of the PWM unit during forward rotation of the motor;

FIG. 13 is a timing chart depicting operation of the PWM unit during reverse rotation of the motor;

FIGS. 18A through 18C illustrate sensor output and regenerative electric power during regeneration;

DESCRIPTION OF THE PREFERRED EMBODIMENT

Figure 1A:
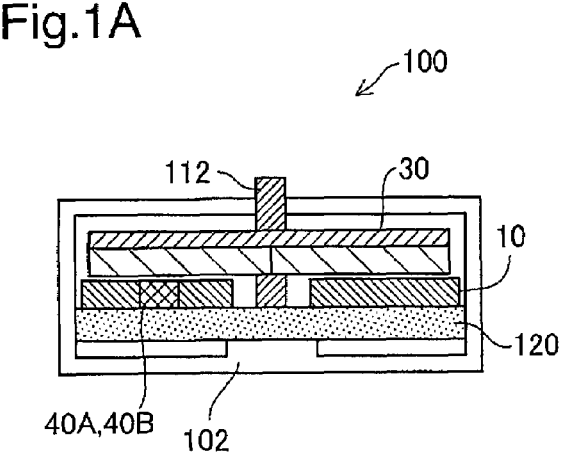
FIGS. 1A through 1C are sectional views of the configuration of the motor unit of a brushless motor in an embodiment.
Figure 1B:
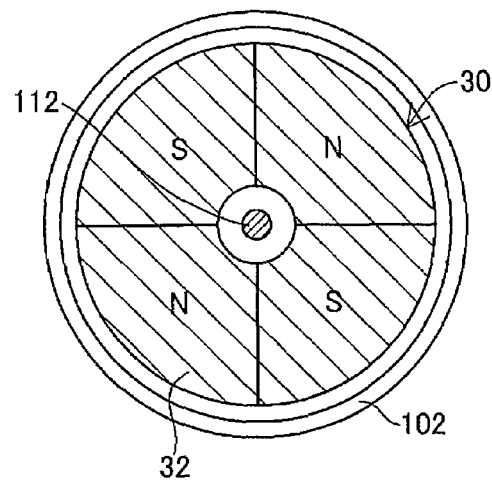
Figure 1C:
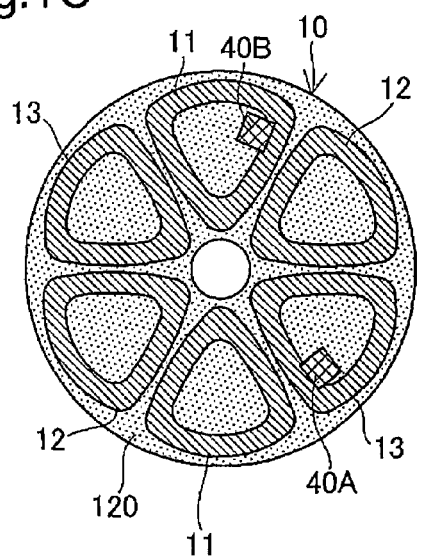

Next, the embodiments of the present invention will be discussed in the order indicated below.
A. Motor Configuration and Overview of Operation
B. Configuration of Drive Control Circuit
C. Configuration of Regeneration Control Circuit
D. Other Embodiments
E. Modification Examples A. Motor Configuration and Overview of Operation FIGS. 1A through 1C depict in sectional view the configuration of the motor unit of a brushless motor in one embodiment of the present invention. This brushless motor has both the function of an electric motor and the function of a generator. However, embodiment as an electrical device having only one or the other of these functions is possible as well.

The motor unit 100 has a stator portion 10 and a rotor portion 30, each of generally disk shape. The stator portion 10 (FIG. 1C) has, disposed on a circuit board 120, three sets of magnet coils 11-13 constituting three phases; and two magnetic sensors 40A, 40B. The first magnetic sensor 40A is the sensor for use with the first set of coils 11; the second magnetic sensor 40B is the sensor for use with the second set of coils 12. No magnetic sensor is installed for the third set of coils 13. Herein, the three sets of magnet coils 11-13 will be termed the "phase A coils 11," "phase B coils 12," and "phase C coils 13." The magnetic sensors 40A, 40B will be termed the "Phase A sensor 40A" and the "Phase B sensor 40B."

The rotor portion 30 (FIG. 1B) is furnished with four magnets 32; the center axis of the rotor portion 30 constitutes a rotating shaft 112. The direction of magnetization of these magnets 32 is the perpendicular to the plane of the paper of FIG. 1B; this corresponds to the vertical direction in FIG. 1A.

Figure 2A:
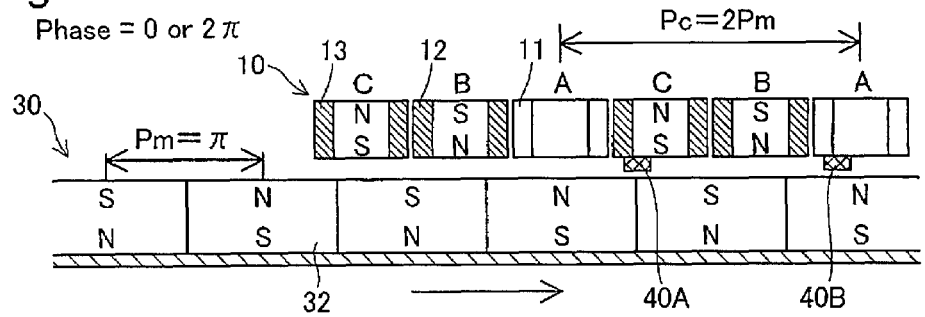
FIGS. 2A through 2D illustrate positional relationships among the magnet array and the coil arrays during motor operation.

FIG. 2A through 2D illustrate positional relationships among the magnet array and the coil arrays during motor operation. As shown in FIG. 2A, the magnets 32 are positioned at constant magnetic pole pitch Pm, with neighboring magnets having opposite direction of magnetization. The two coils making up a single coil group are positioned at constant pitch Pc, and are always excited in the same direction. Coils of adjacent phases are spaced apart by the equivalent of one-third the pitch Pc between coils of the same phase. The pitch Pc between coils of the same phase is equal to twice the magnetic pole pitch Pm. Expressed as the electrical angle, the magnetic pole pitch Pm corresponds to $\pi$. An electrical angle of $2\pi$ is associated with the mechanical angle or distance of displacement occurring when the phase of the drive signal changes by the equivalent of $2\pi$. In the present embodiment, when the drive signal phase changes by the equivalent of $2\pi$, the rotor portion 30 will undergo displacement by the equivalent of twice the magnetic pole pitch Pm.

Figure 2B:
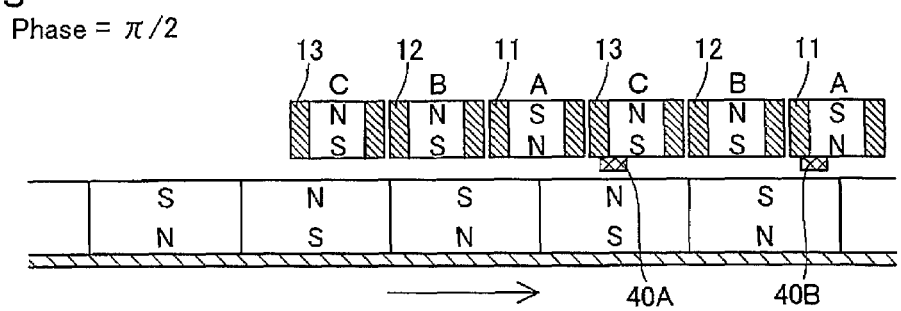
Figure 2C:
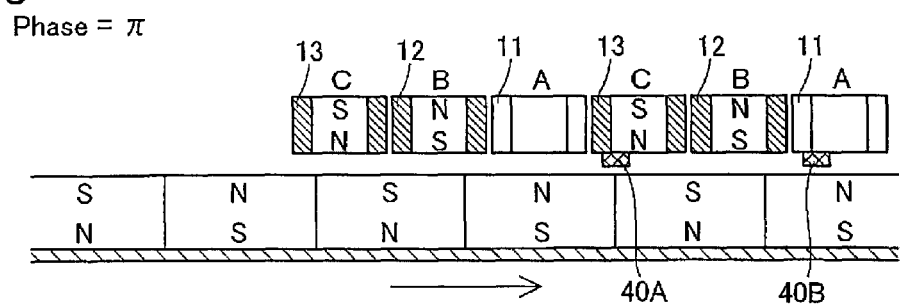
Figure 2D:
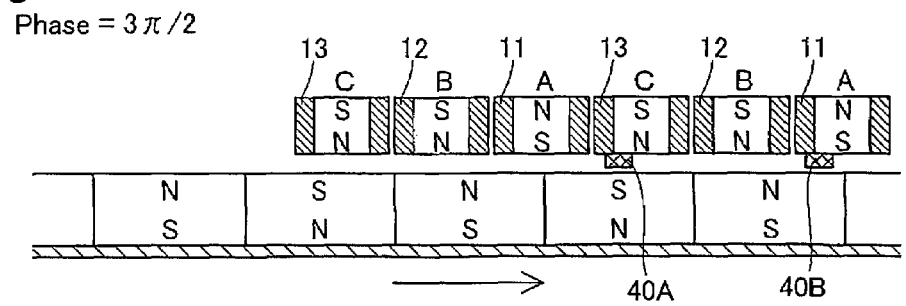

FIG. 2A depicts a state with the phase at 0 or $2\pi$. FIGS. 2B through 2D depict states at points in time with the phase at $\pi/2$, $\pi$, and $3\pi/2$, respectively. In FIGS. 2A and 2C the Phase A coils are shown without hatching; this is because the polarity of the drive signal of the Phase A coils 11 reverses (i.e. the excitation direction reverses) at this timing.

Figure 3A:
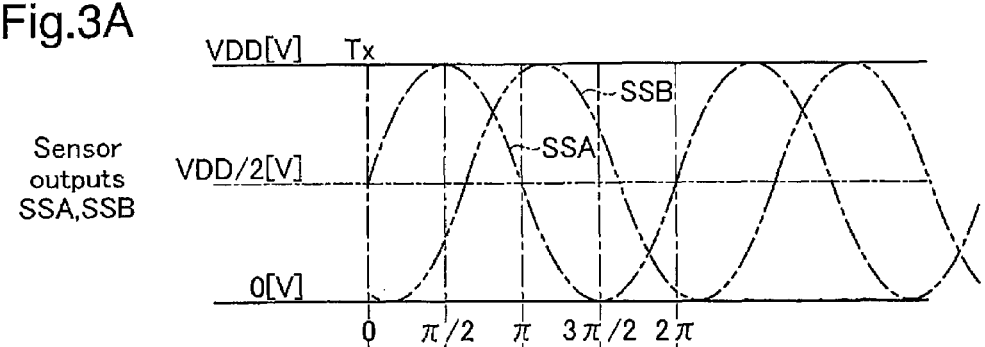
FIGS. 3A through 3C illustrate exemplary sensor outputs and drive signals during forward operation of the motor.
Figure 3B:
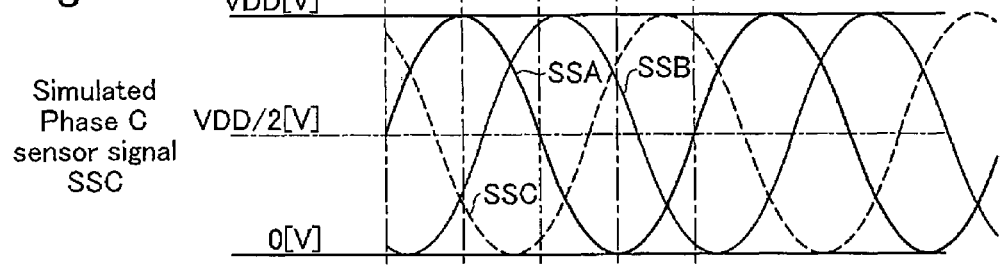
Figure 3C:
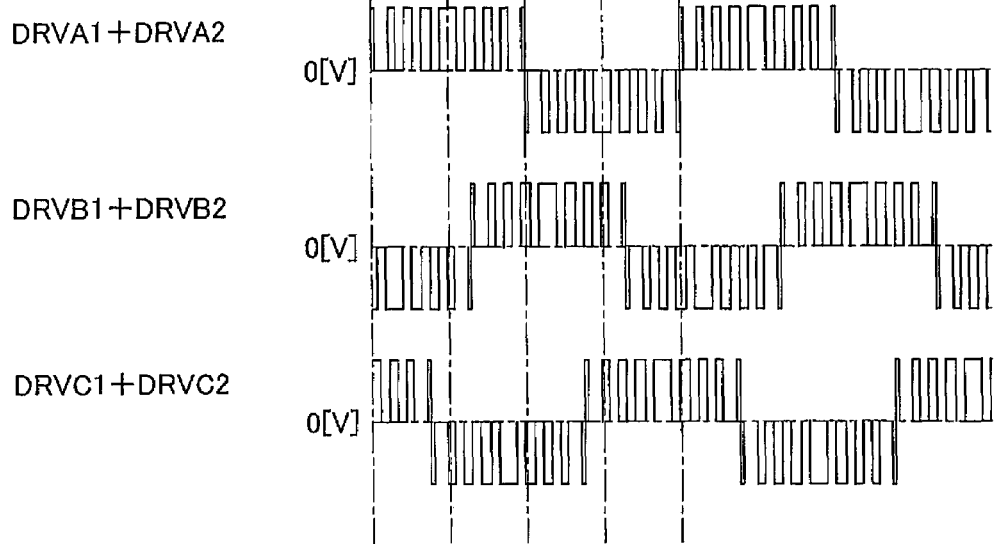

FIGS. 3A through 3C depict exemplary sensor outputs and drive signals during forward operation of the motor. FIG. 3A shows a sensor output SSA of the Phase A sensor 40A and a sensor output SSB of the Phase B sensor 40B. Hall IC sensors having analog output may be employed as the sensors 40A, 40B. FIG. 3B shows a simulated Phase C sensor output SSC (also called "simulated Phase C sensor signal SSC") synthesized from the two sensor outputs SSA, SSB. The method of generating the simulated Phase C sensor signal SSC will be discussed later. The three sensor outputs SSA, SSB, SSC can be understood to constitute three phase signals sequentially shifted in phase in increments of $2\pi/3$.

FIG. 3C depicts three phase drive signals respectively generated through PWM control utilizing these three phase sensor outputs SSA, SSB, SSC. The Phase A drive signals DRVA1 and DRVA2 have effective voltage with shape similarity to the Phase A sensor output SSA. The first Phase A drive signal DRVA1 is a signal that pulses only when the sensor output SSA is positive, and the second drive signal DRVA2 is a signal that pulses only when the sensor output SSA is negative; these are shown together in FIG. 3C. For convenience, the second drive signal DRVA2 is depicted as negative pulses. The other phases are similar.

Figure 4A:
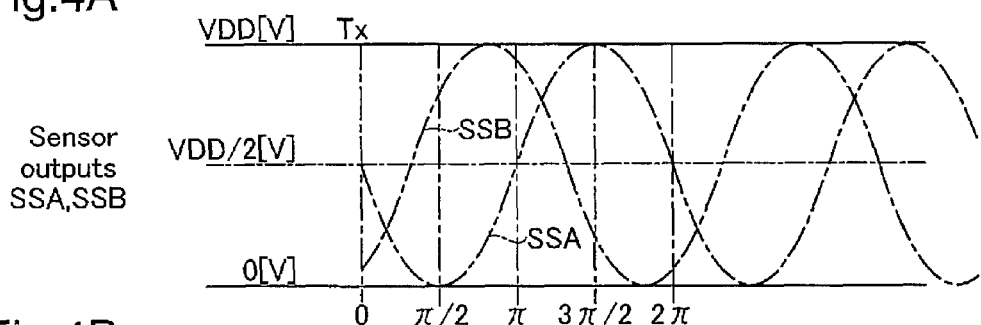
FIGS. 4A through 4C illustrate exemplary sensor outputs and drive signals during reverse operation of the motor.
Figure 4B:
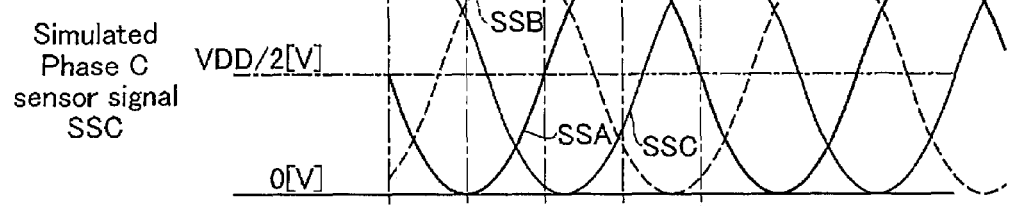
Figure 4C:
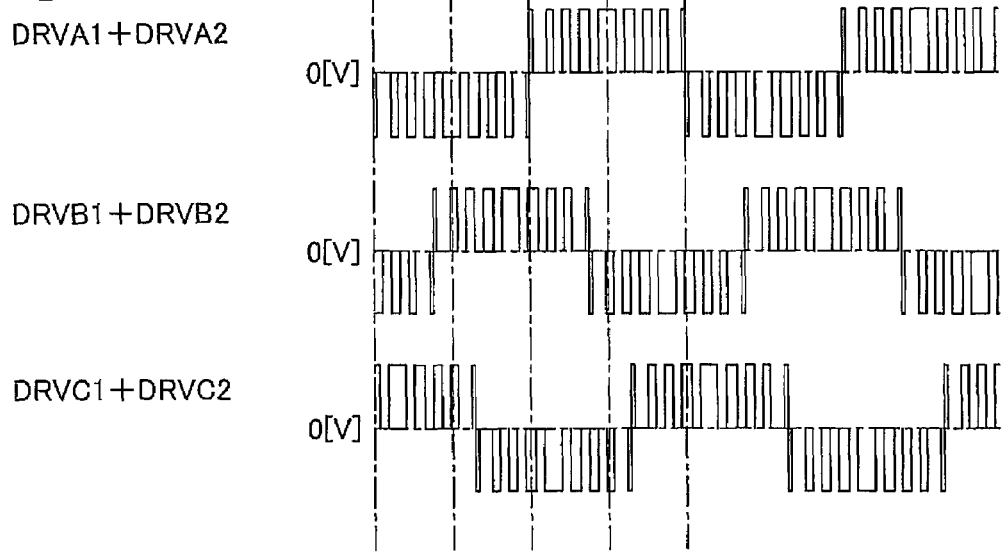

FIGS. 4A through 4C depict exemplary sensor outputs and drive signals during reverse operation of the motor. As in FIGS. 3A through 3C, during reverse operation as well, a Phase C sensor output SSC is synthesized from the other two phase sensor outputs SSA, SSB, and these three sensor outputs SSA, SSB, SSC are used to generate three phase drive signals.

Similarly, when regenerating the power from the coils 11-13, a Phase C sensor output SSC is synthesized from the other two phase sensor outputs SSA, SSB, and these three sensor outputs SSA, SSB, SSC are used to generate three phase regeneration control signals.

Figure 5:
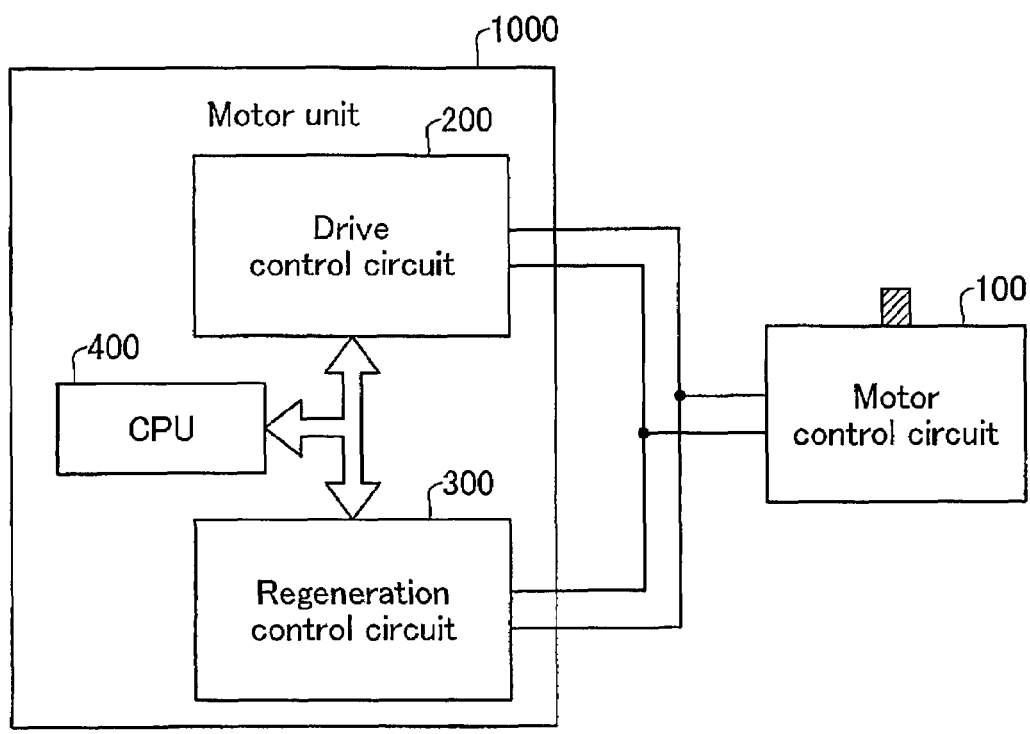
FIG. 5 is a block diagram depicting the configuration of the motor control circuit of the brushless motor of the embodiment.

FIG. 5 is a block diagram depicting the configuration of the motor control circuit of the brushless motor of the embodiment. The motor control circuit 1000 has a drive control circuit 200, a regeneration control circuit 300, and a CPU 400. The CPU 400 has functions such as establishing values in various registers within the control circuits 200, 300, and assigning command or control values within the control circuits 200, 300. The configuration and operation of the drive control circuit 200 and the regeneration control circuit 300 will be discussed in order below.

B. Configuration of Drive Control Circuit

Figure 6A:
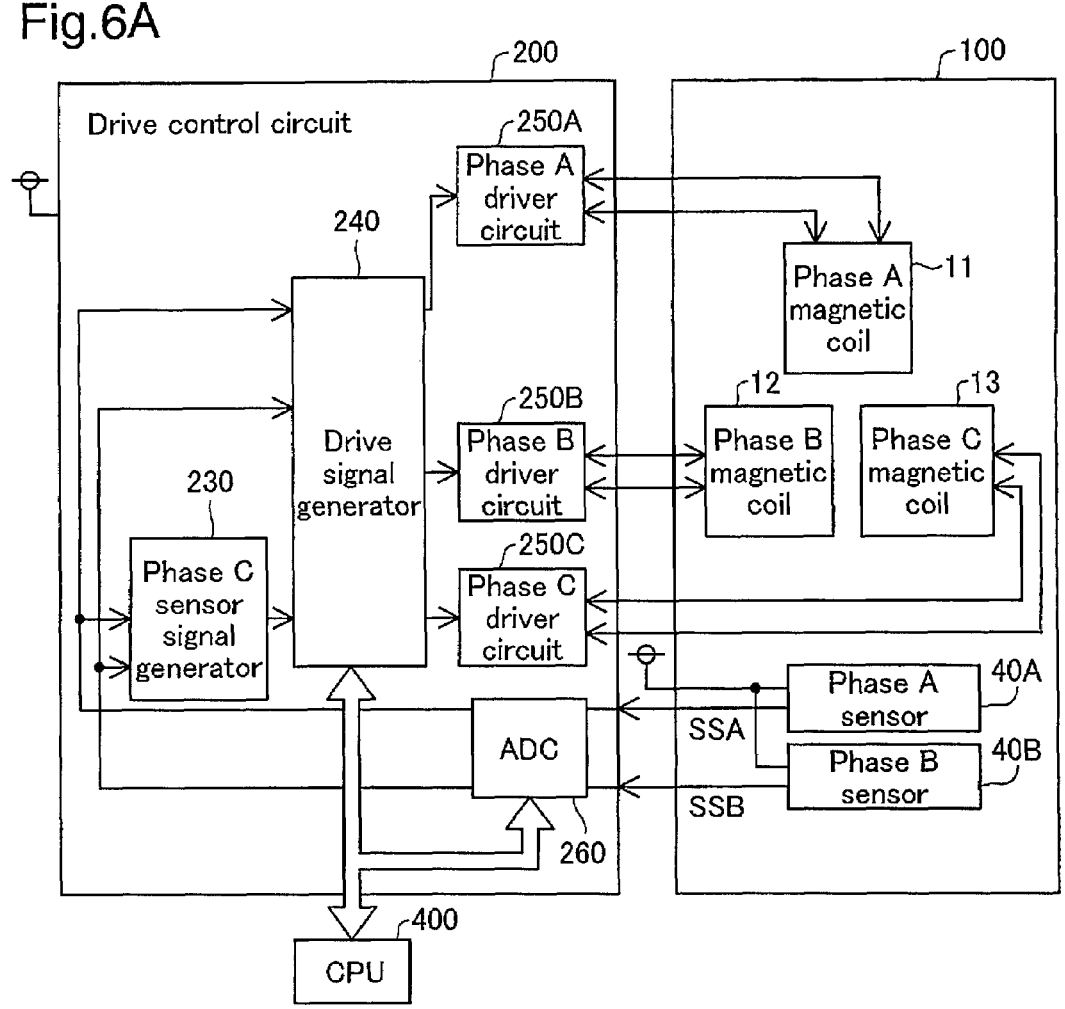
FIGS. 6A and 6B are block diagrams depicting the configuration of a drive control circuit of the brushless motor of the embodiment.

FIG. 6A is a block diagram depicting the configuration of a drive control circuit of the brushless motor of the embodiment. The drive control circuit 200 has a CPU 400, a Phase C sensor signal generator 230, a drive signal generator 240, three phase driver circuits 250A-250C, and an AD converter 260. The two sensor outputs SSA, SSB are converted to a digital multivalue signal by the AD converter 260 and presented to the Phase C sensor signal generator 230. The Phase C sensor signal generator 230 generates the simulated Phase C sensor signal SSC shown in FIG. 3B. The internal configuration of the Phase C sensor signal generator 230 will be discussed later. The drive signal generator 240 generates three phase drive signals (FIG. 3C) on the basis of the three phase sensor outputs SSA, SSB, SSC. In accordance with these three phase drive signals, the driver circuits 250A-250C drive the three phase magnet coil groups 11-13 in the motor unit.

Figure 6B:
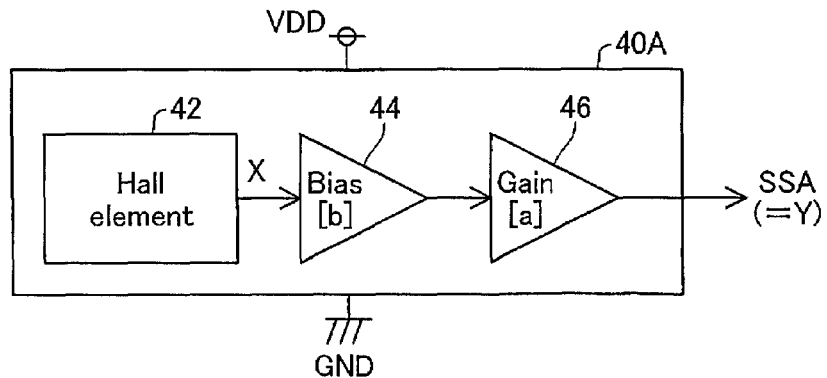

FIG. 6B depicts an exemplary internal configuration of the magnetic sensor 40A. The Phase B magnetic sensor 40B has the same configuration. This magnetic sensor 40A has a Hall element 42, a bias adjuster circuit 44, and a gain adjuster circuit 46. The Hall element 42 measures magnetic flux density X. The bias adjusting portion 44 adds a bias value b to the output X of the Hall element 42; the gain adjusting portion 46 performs multiplication by a gain value a. The output SSA (=Y) of the magnetic sensor 40A is given by Expression (1) or (2) below, for example.

$$Y=a \cdot X+b \quad (1)$$

$$Y=a(X+b) \quad (2)$$

The gain value a and the bias value b of the magnetic sensor 40A are set within the magnetic sensor 40A by the CPU 400. By setting the gain value a and the bias value b to appropriate values, it is possible to correct the sensor output SSA to an appropriate waveform. The arrangement is the same for the Phase B sensor 40B as well.

In the present embodiment, magnetic sensors are provided for only two phases (Phase A and Phase B) of the three phase coil groups; there is no magnetic sensor for the one other phase (Phase C). By setting gain and bias (also termed "offset") to appropriate values, the magnetic sensors can provide sensor outputs with appropriate waveforms. However, in order to obtain respective sensor outputs with appropriate waveforms, it will be necessary to perform an operation or calibration to measure the respective sensor outputs and set gain and bias to appropriate values. An advantage of present the embodiment is that, since magnetic sensors are provided for only two of the three phases, calibration of the magnetic sensor for one phase can be dispensed with. Another advantage is that, provided that the outputs SSA, SSB of the two installed phase magnetic sensors have been correctly calibrated, it will be a simple matter to match the phases of the three phase drive signals. The smaller number of sensors is also desirable from a cost standpoint.

Figure 7A:
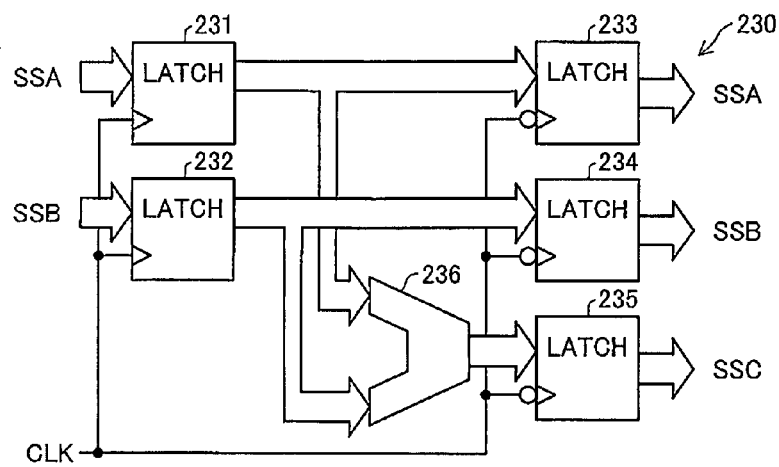
FIG. 7A is a block diagram depicting the internal configuration of a Phase C sensor signal generator.

FIG. 7A is a block diagram depicting the internal configuration of the Phase C sensor signal generator 230. The Phase C sensor signal generator 230 has five latch circuits 231-235 and an arithmetic circuit 236. The first and second latch circuits 231, 232 respectively latch the Phase A sensor output SSA and the Phase B sensor output SSB in sync with the rising edge of a clock signal CLK. The third and fourth latch circuits 233, 234 respectively latch the outputs of the first and second latch circuits 231, 232 in sync with the falling edge of the clock signal CLK. The arithmetic circuit 236 generates the simulated Phase C sensor output SSC by means of performing computations in real time using the outputs of both the first and second latch circuits 231, 232. The fifth latch circuit 235, in sync with the falling edge of the clock signal CLK, latches the sensor output SSC output by the arithmetic circuit 236. As a result, three phase signals SSA, SSB, SSC are output at identical timing from three of the latch circuits 223-235.

Figure 7B:
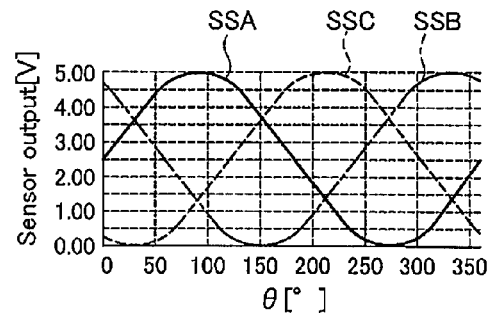
FIG. 7B shows the generation of the simulated Phase C sensor signal.

FIG. 7B depicts the specifics of computations performed by the arithmetic circuit 236. The table shows values of the sensor outputs SSA, SSB, SSC of each phase, specific to an angle θ (or phase). In the embodiment, the range of each sensor output is assumed to lie between 0 and VDD (where VDD is the power supply voltage). The Phase C sensor output SSC can be computed in accordance with the following computational expression.

$$SSC = -(SSB - (VDD/2)) - (SSA - (VDD/2)) + (VDD/2)$$
$$= -SSB - SSA + 3/2 \cdot (VDD)$$

It is also possible to use a lookup table having the Phase A and Phase B sensor outputs as the input values and the Phase C sensor output SSC as the output value, in place of the arithmetic circuit 236. This lookup table would have previously stored therein the results of the aforementioned computations, and would function in the same manner as the arithmetic circuit 236 in terms of affording the Phase C sensor output SSC based on computations. The circuit which performs the above computations may be either an analog circuit or a digital circuit.

Figure 8A:
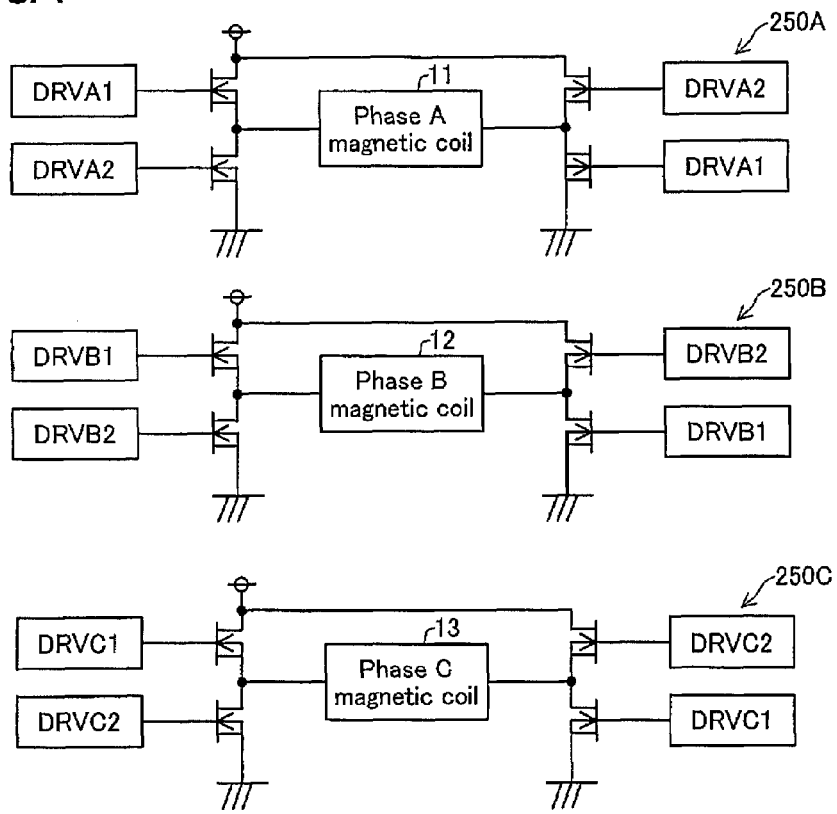
FIGS. 8A and 8B depict internal configuration of a driver circuit.
Figure 8B:
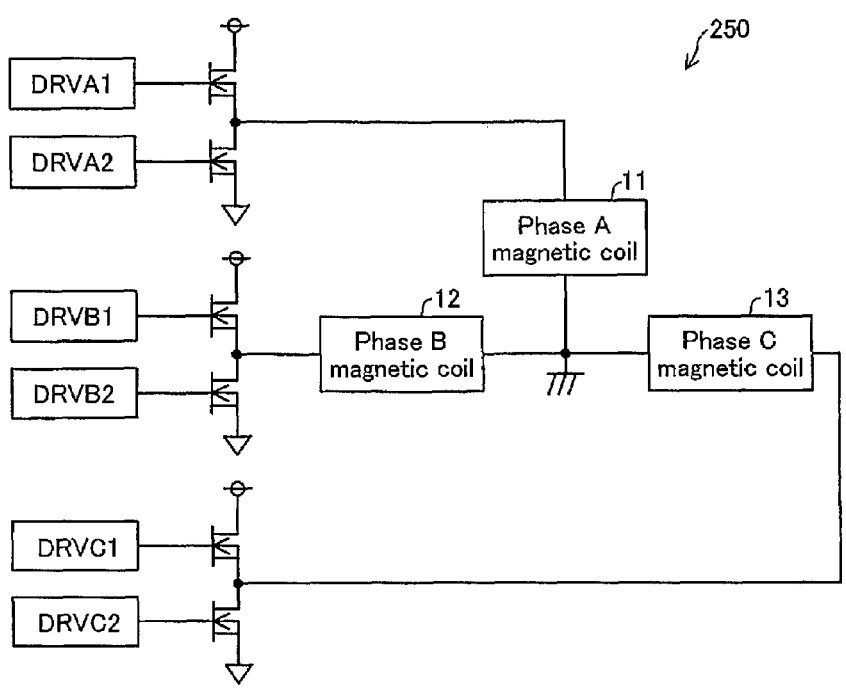

FIG. 8A depicts the internal configuration of a driver circuit. The driver circuits 250A-250C of each phase are respectively composed of H-bridge circuits. For example, the Phase A driver circuit 250A drives the Phase A coils 11 according to the drive signals DRVA1, DRVA2. The arrows labeled IA1, IA2 respectively indicate the direction of current flow by the drive signals DRVA1, DRVA2, respectively. This applies to the other phases as well. FIG. 8B shows an example of a driver circuit 250 having a smaller number of transistors, with the three phase coil groups 11-13 in a "star" wiring arrangement.

FIGS. 9A through 9E illustrate the internal configuration and operation of the drive signal generator 240 (FIG. 6A). Here, for convenience in illustration only the Phase A circuit elements are shown; identical circuit elements would be provided for Phase B and Phase C as well.

The drive signal generator 240 has a basic clock generating circuit 510, a 1/N frequency divider 520, a PWM unit 530, a moving direction register 540, a multiplier 550, an encoder 560, a voltage control value register 580, and an excitation interval setter 590.

The basic clock generating circuit 510 is a circuit that generates a clock signal PCL having prescribed frequency, and is composed of a PLL circuit, for example. The frequency divider 520 generates a clock signal SDC of a frequency having a frequency 1/N that of the clock signal PCL. The value of N is set to a prescribed constant. This value of N has been previously set in the frequency divider 520 by the CPU 400. In response to the clock signals PCL, SDC, a multiplication value Ma supplied by the multiplier 550, a forward/reverse direction value RI supplied by the moving direction register 540, positive/negative sign signal Pa supplied by the encoder 560, and an excitation interval signal Ea supplied by the excitation interval setter 590, the PWM unit 530 generates the Phase A drive signals DRVA1, DRVA2 (FIG. 3C). This operation will be discussed later.

The value RI indicating the direction of rotation of the motor is set in the moving direction register 540 by the CPU 400. In the present embodiment, the motor undergoes forward rotation when the forward/reverse direction value RI is L level, and reverse rotation when it is H level. The other signals Ma, Pa, and Ea presented to the PWM unit 530 are determined in the following manner.

The output SSA of the magnetic sensor 40A is presented to the encoder 560. The encoder 560 converts the range of the sensor output SSA, while setting the value of the middle point of the sensor output to 0. As a result, the sensor output value Xa generated by the encoder 560 assumes values in a prescribed positive range (e.g. between +127 and 0) and in a prescribed negative range (e.g. between 0 and −127). However, the sensor output value Xa presented to the multiplier 550 by the encoder 560 is an absolute value; the positive or negative sign thereof is provided to the PWM unit 530 in the form of the positive/negative sign signal Pa.

The voltage control value register 580 stores a voltage control value Ya set by the CPU 400. This voltage control value Ya, together with the excitation interval signal Ea discussed later, functions as a value for setting application voltage of the motor. This voltage control value Ya can assume a value of 0 to 1.0, for example. Assuming an instance where the excitation interval signal Ea has been set in such a way that all intervals are excitation intervals, with no non-excitation intervals being provided, Ya=0 will mean that the application voltage is zero, and Ya=1.0 will mean that the application voltage is at its maximum value. The multiplier 550 performs multiplication of the voltage control value Ya and the sensor output value Xa supplied from the encoder 560 and conversion to an integer; the multiplication value Ma thereof is presented to the PWM unit 530.

FIGS. 9B through 9E depict operation of the PWM unit 530 in instances where the multiplication value Ma assumes various different values. Here, it is assumed that all intervals are excitation intervals and that there are no non-excitation intervals. The PWM unit 530 is a circuit that, during one cycle of the clock signal SDC, generates one pulse at a duty factor of Ma/N. Specifically, as shown in FIGS. 9B through 9E, in association with increase of the multiplication value Ma, the pulse duty factor of the Phase A drive signals DRVA1, DRVA2 increases as well. The first drive signal DRVA1 is a signal that generates a pulse only when the sensor output SSA is positive, and the second drive signal DRVA2 is a signal that generates a pulse only when the sensor output SSA is negative; in FIGS. 9B to 9E, these are shown together. For convenience, the second drive signal DRVA2 is shown as negative pulses.

FIGS. 10A through 10C depict correspondence relationships between sensor output waveforms and waveforms of drive signals generated by the PWM unit 530. In the drawings, "Hiz" denotes a high impedance state with the magnet coils in the unexcited state. As explained with reference to FIGS. 9A-9E, the Phase A drive signals DRVA1, DRVA2 are generated by PWM control using the analog waveform of the Phase A sensor output. Consequently, using these Phase A drive signals DRVA1, DRVA2 it is possible to present the coils with effective voltage exhibiting change in level corresponding to change in the sensor output SSA.

The PWM unit 530 is furthermore designed so as to output a drive signal only during excitation intervals indicated by the excitation interval signal Ea supplied by the excitation interval setter 590, while not outputting a drive signal during intervals other than the excitation intervals (non-excitation intervals). FIG. 10C depicts drive signal waveforms produced in the case where excitation intervals EP and non-excitation intervals NEP have been established by the excitation interval signal Ea. During excitation intervals EP, the drive signal pulses of FIG. 10B are generated as is; drive signal pulses are not generated during non-excitation intervals NEP. By establishing excitation intervals EP and non-excitation intervals NEP in this way, voltage will not be applied to coils at a point in proximity to the middle point of sensor output (this corresponds to proximity to the middle point of the back electromotive force waveform), thus making possible further improvement of motor efficiency. In preferred practice excitation intervals EP will be established at intervals symmetric about the peak of the sensor output waveform (this is substantially equivalent to the back electromotive force waveform), and the non-excitation intervals NEP will be established at intervals symmetric about the middle point (center point) of the sensor output waveform.

As discussed previously, if the voltage control value Ya is set to a value less than 1, the multiplication value Ma will be small in proportion to the voltage control value Ya. Consequently, effective adjustment of application voltage through the voltage control value Ya is possible as well.

As will be understood from the preceding discussion, with the motor of the present embodiment, it is possible to adjust the application voltage using both the voltage control value Ya and the excitation interval signal Ea. In preferred practice, relationships between the preferred application voltage on the one hand, and the voltage control value Ya and the excitation interval signal Ea on the other, will be stored in advance in table format in memory in the drive control circuit 200 (FIG. 6A). By so doing, when the drive control circuit 200 has received from outside a preferred application voltage target value, it will be possible for the CPU 400, in response to the target value, to set the voltage control value Ya and the excitation interval signal Ea in the drive signal generator 240. Adjustment of application voltage does not require the use of both the voltage control value Ya and the excitation interval signal Ea, and it would be acceptable to use either of these instead.

Figure 11:
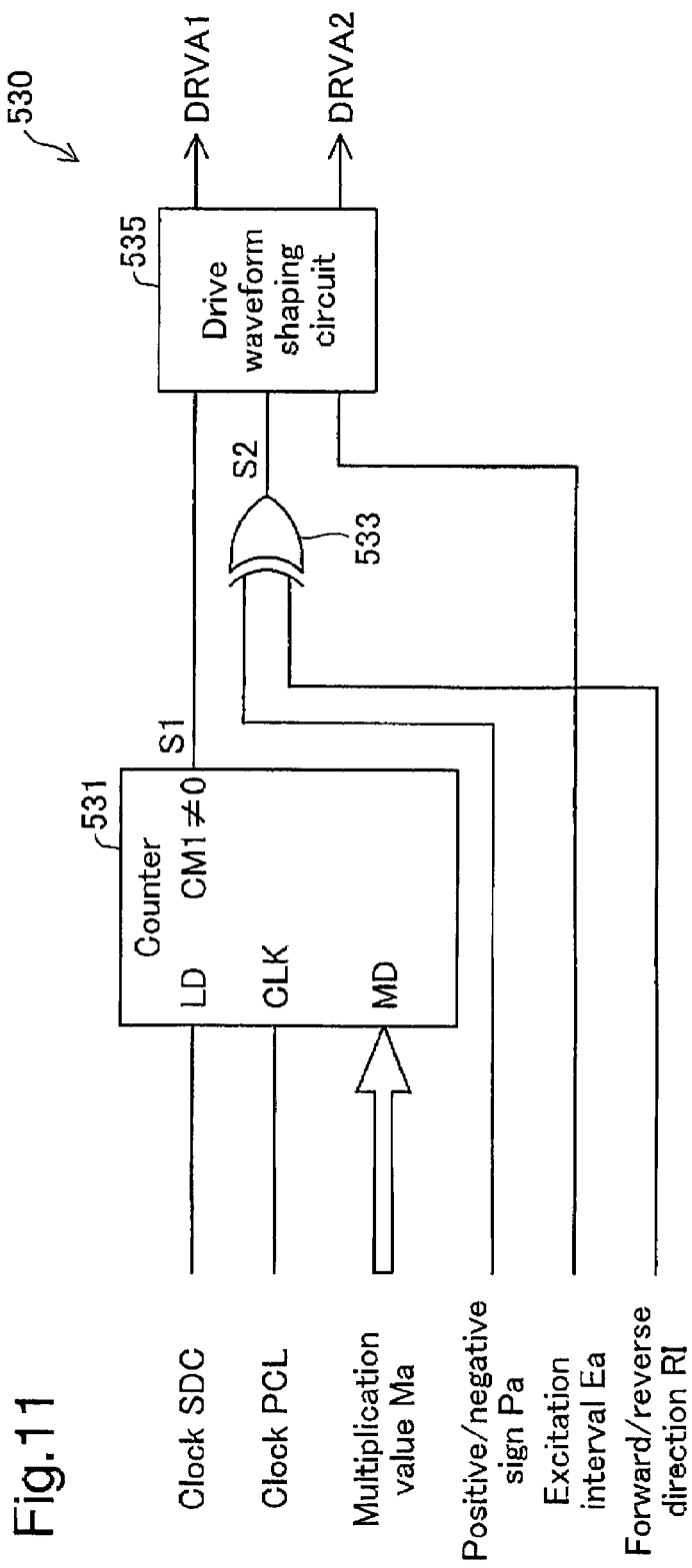
FIG. 11 is a lock diagram depicting the internal configuration of a PWM unit.

FIG. 11 is a block diagram depicting the internal configuration of the PWM unit 530 (FIG. 9A). The PWM unit 530 has a counter 531, an EXOR circuit 533, and a drive waveform shaping circuit 535. Their operation will be described below.

FIG. 12 is a timing chart depicting operation of the PWM unit 530 during forward rotation of the motor. In the drawing, the two clock signals PCL and SDC, the forward/reverse direction value RI, the excitation interval signal Ea, the multiplication value Ma, the positive/negative sign signal Pa, the counter value CM1 in the counter 531, the output SI of the counter 531, the output S2 of the EXOR circuit 533, and the output signals DRVA1, DRVA2 of the drive waveform shaping circuit 535 are shown. In each one cycle of the clock signal SDC, the counter 531 repeats an operation to decrement the count value CM1 down to 0, in sync with the clock signal PCL. The initial value of the count value CM1 is set to the multiplication value Ma. In FIG. 12, for convenience in illustration, negative multiplication values Ma are shown as well; however, the absolute value |Ma| thereof will be used in the counter 531. The output S1 of the counter 531 is set to H level when the count value CM1 is not 0, and drops down to L level when the count value CM1 goes to 0.

The EXOR circuit 533 outputs a signal S2 representing exclusive OR of the positive/negative sign signal Pa and the forward/reverse direction value RI. When the motor is running forward, the forward/reverse direction value RI is L level. Consequently, the output S2 of the EXOR circuit 533 will be a signal identical to the positive/negative sign signal Pa. The drive waveform shaping circuit 535 generates the drive signals DRVA1, DRVA2 from the output S1 of the counter 531 and the output S2 of the EXOR circuit 533. Specifically, in the output S1 of the counter 531, the signal of intervals at which the output S2 of the EXOR circuit 533 is L level is output as the drive signal DRVA1, and the signal of intervals at which the output S2 of the EXOR circuit 533 is H level is output as the drive signal DRVA2. The excitation interval signal Ea falls to L level in proximity to the right edge in FIG. 12, thereby setting up a non-excitation interval NEP. Consequently, neither of the drive signals DRVA1, DRVA2 will be output during this non-excitation interval NEP, and a state of high impedance will be maintained.

FIG. 13 is a timing chart depicting operation of the PWM unit 530 during reverse rotation of the motor. When the motor is running in reverse, the forward/reverse direction value RI is H level. As a result, the two drive signals DRVA1, DRVA2 switch position with those in FIG. 12, and it will be appreciated that the motor runs in reverse as a result.

Figure 14A:
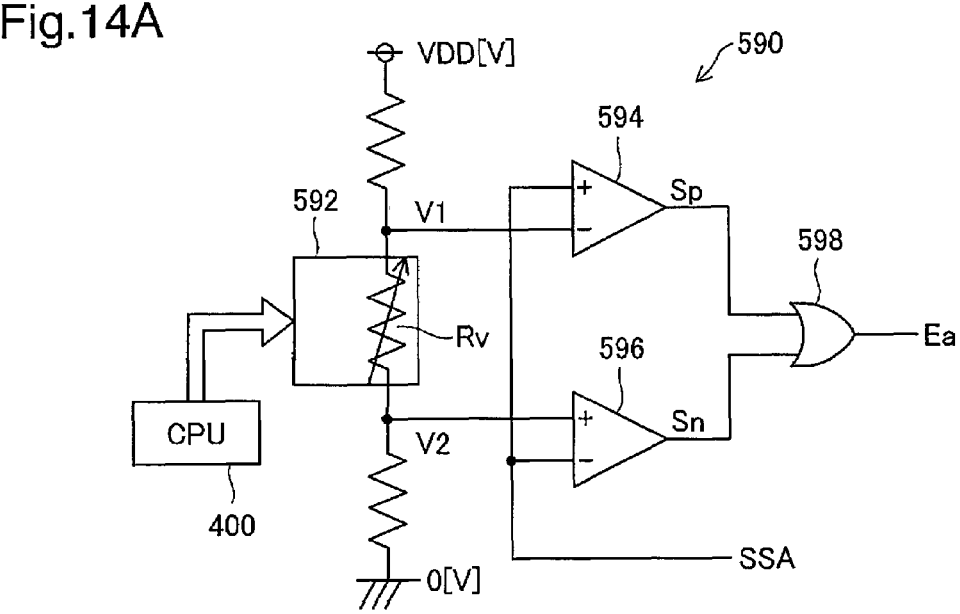
FIGS. 14A and 14B depict the internal configuration and operation of an excitation interval setter.
Figure 14B:
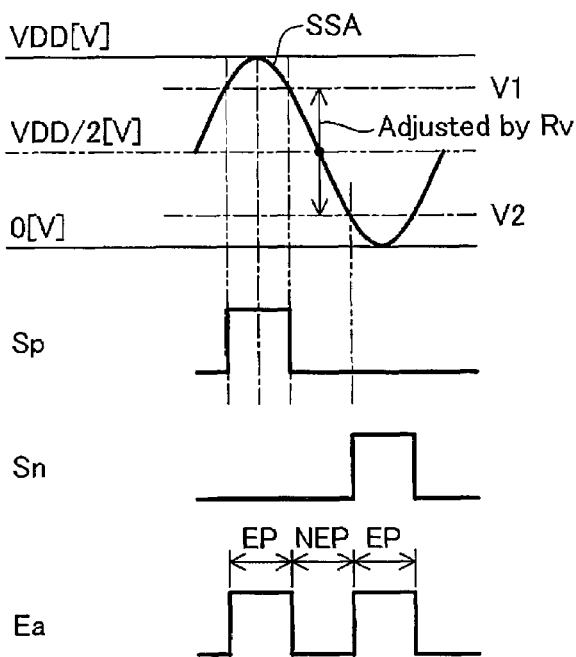

FIGS. 14A and 14B depict the internal configuration and operation of the excitation interval setter 590. The excitation interval setter 590 has an electronic variable resistor 592, voltage comparators 594, 596, and an OR circuit 598. The resistance Rv of the electronic variable resistor 592 is set by the CPU 400. The voltages V1, V2 at the two terminals of the electronic variable resistor 592 are presented to one input terminal of each of the voltage comparators 594, 596. The sensor output SSA is presented to the other input terminal of the voltage comparators 594, 596. The output signals Sp, Sn of the voltage comparators 594, 596 are input to the OR circuit 598. The output of the OR circuit 598 is the excitation interval signal Ea, used for distinguishing excitation intervals from non-excitation intervals.

FIG. 14B depicts operation of the excitation interval setter 590. The two terminal voltages V1, V2 of the electronic variable resistor 592 are modified by adjusting the resistance Rv. Specifically, the two terminal voltages V1, V2 are set to values of equal difference from the median value of the voltage range (=VDD/2). In the event that the sensor output SSA is higher than the first voltage V1, the output Sp of the first voltage comparator 594 will go to H level, whereas in the event that the sensor output SSA is lower than the second voltage V2, the output Sn of the second voltage comparator 596 will go to H level. The excitation interval signal Ea is a signal that assumes the logical sum of these output signals Sp, Sn. Consequently, as shown at bottom in FIG. 14B, the excitation interval signal Ea can be used as a signal for indicating the excitation intervals EP and the non-excitation intervals NEP. The excitation intervals EP and the non-excitation intervals NEP are established by means of adjustment of the variable resistance Rv by the CPU 400.

According to the brushless motor of Embodiment 1 discussed above, magnetic sensors are installed for only two of the three phase coil groups, with no magnetic sensor provided for the one other phase, whereby the workload associated with sensor calibration can be reduced and the phases of the three phase drive signals can be easily matched. Furthermore, an efficient motor can be provided at low cost.

C. Configuration of Regeneration Control Circuit

Figure 15:
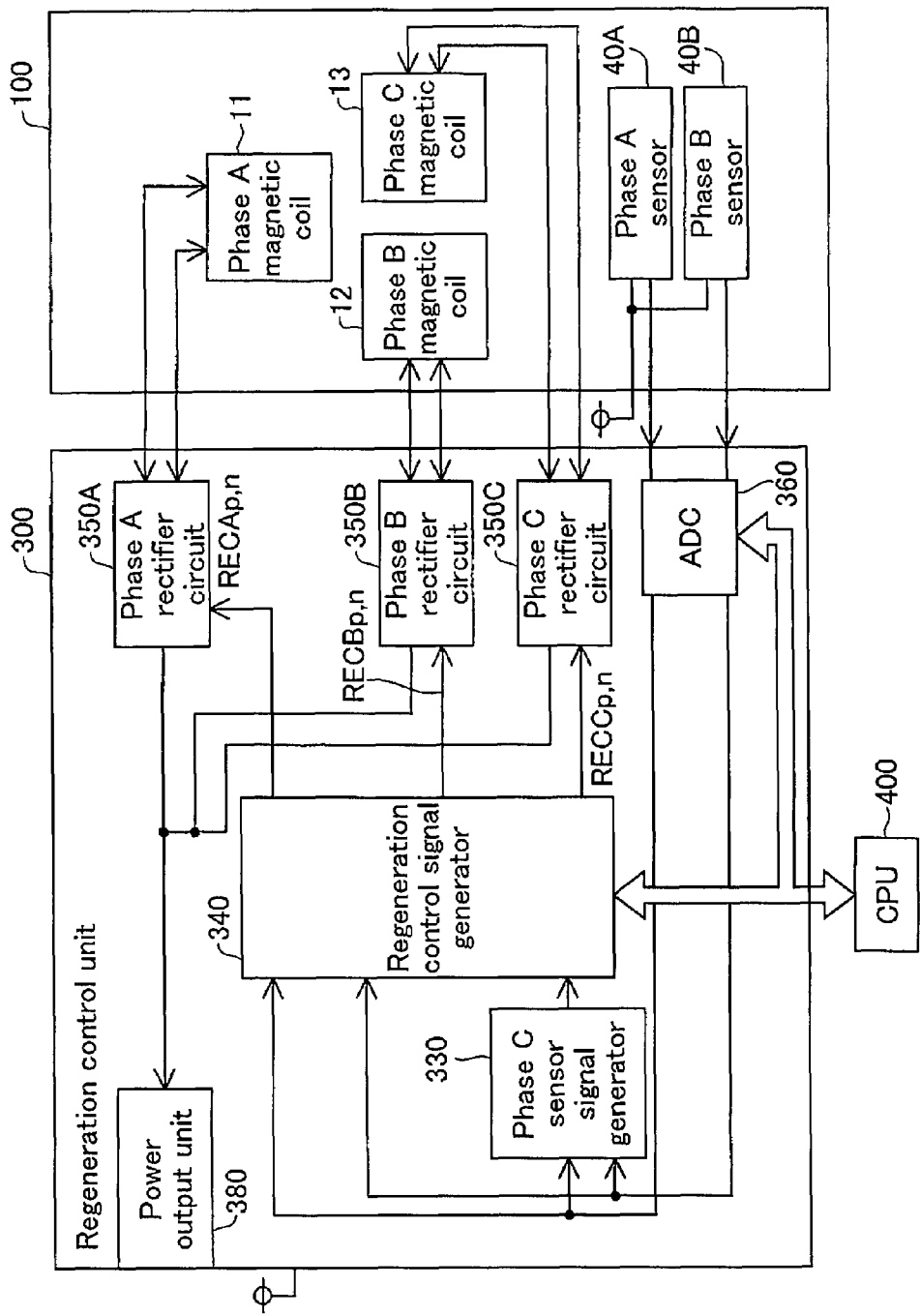
FIG. 15 is a block diagram depicting the configuration of the regeneration control circuit of the brushless motor of the embodiment.

FIG. 15 is a block diagram depicting the configuration of the regeneration control circuit of the brushless motor of the embodiment. The regeneration control circuit 300 has a Phase C sensor signal generator 330, a regeneration control signal generator 340, three phase rectifier circuits 350A-350C, an AD converter 360, and a power output unit 380. The two sensor outputs SSA, SSB are converted to a digital multivalue signal by the AD converter 360 and presented to the Phase C sensor signal generator 330. The Phase C sensor signal generator 330 generates the simulated Phase C sensor signal SSC shown in FIG. 3B. The internal configuration of the Phase C sensor signal generator 330 is the same as that described in FIG. 7A. It is also possible to provide a single Phase C sensor signal generator only, for shared use by the two control circuits 200, 300. In this case, it is possible to provide a single AD converter 260, 360 as well.

On the basis of the three phase sensor outputs SSA, SSB, SSC, the regeneration control signal generator 340 generates three phase regeneration control signals (RECAp, RECAn), (RECBp, RECBn), and (RECCp, RECCn). In accordance with these three phase regeneration control signals, the rectifier circuits 350A-350C regenerate the power from the three phase magnet coil groups 11-13 within the motor unit 100. The regenerative electric power is supplied to the outside via the power output unit 380.

Figure 16A:
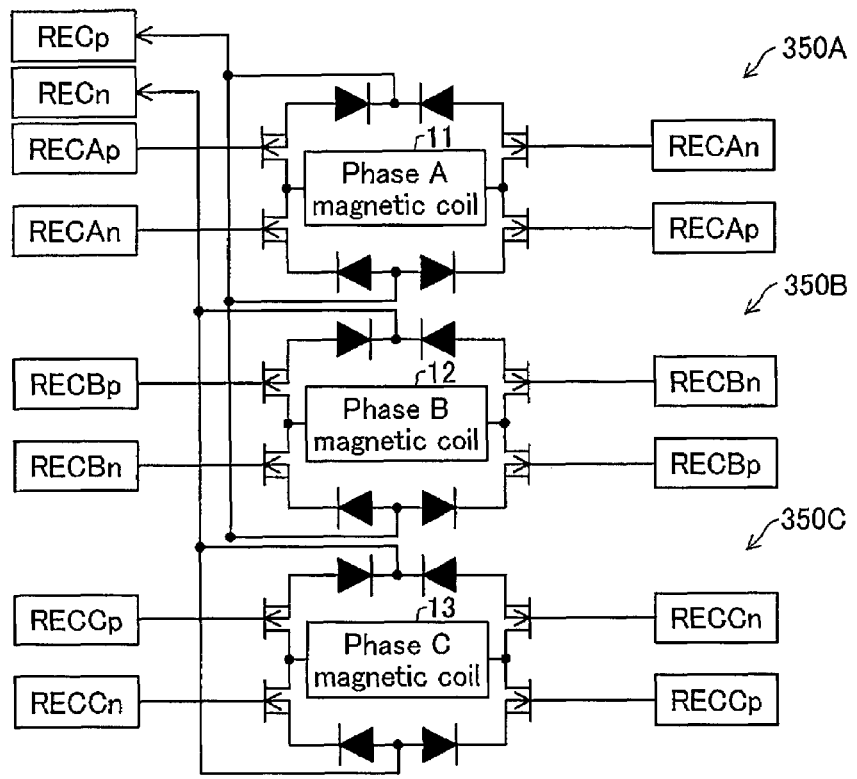
FIGS. 16A and 16B depict the internal configuration of the rectifier circuits.
Figure 16B:
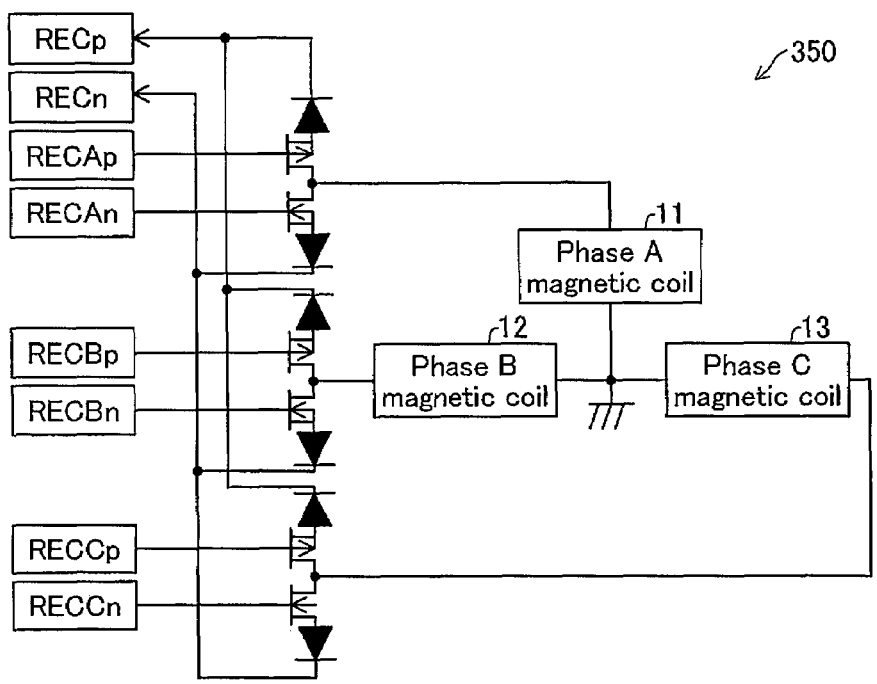

FIG. 16A depicts the internal configuration of the rectifier circuits. The rectifier circuits 350A-350C for the three phases are respectively constituted as full-wave rectifier circuits each having an H bridge circuit and additional rectifier elements such as diodes. For example, the Phase A rectifier circuit 350A rectifies the power from the Phase A coil 11 according to the regeneration control signals RECAp, RECAn. The rectified power from the three phase coils 11-13 is output to the outside from the power output unit 380, in the form of regenerative electric power signals RECp, RECn. FIG. 16B illustrates an exemplary rectifier circuit 350 having a smaller number of diodes and transistors, with the three phase coil groups 11-13 in a "star" wiring arrangement.

Figure 17A:
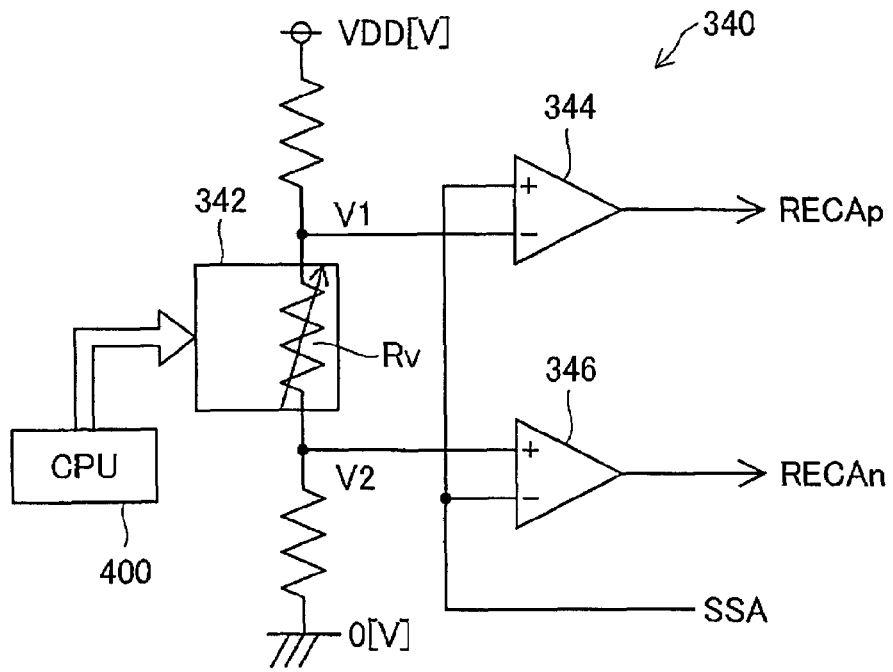
FIGS. 17A and 17B depict the internal configuration and operation of the regeneration control signal generator.
Figure 17B:
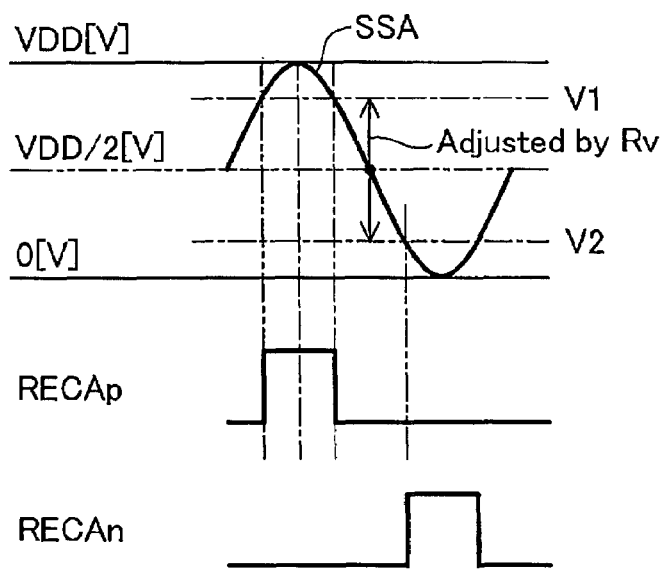

FIGS. 17A and 17B depict the internal configuration and operation of the regeneration control signal generator 340. The regeneration control signal generator 340 has an electronic variable resistor 342 and voltage comparators 344, 346. This regeneration control signal generator 340 has the same configuration as the excitation interval setter 590 shown in FIG. 14A, but without the OR circuit 598. The resistance Rv of the electronic variable resistor 342 is set by the CPU 400. The voltages V1, V2 at the two terminals of the electronic variable resistor 342 are presented to one input terminal of each of the voltage comparators 344, 346. The sensor output SSA is presented to the other input terminal of the voltage comparators 344, 346. As a result, the output signals RECAp, RECAn of the voltage comparators 344, 346 are presented to the control terminals of the rectifier circuit 350A shown in FIG. 16A. While only the Phase A circuit is depicted in FIG. 17A, identical circuits is provided for Phase B and Phase C as well.

FIG. 17B depicts operation of the regeneration control signal generator 340. The two terminal voltages V1, V2 of the electronic variable resistor 342 are modified by adjusting the resistance Rv. Specifically, the two terminal voltages V1, V2 are set to values of equal difference from the median value of the voltage range (=VDD/2). In the event that the sensor output SSA is higher than the first voltage V1, the output RECAp of the first voltage comparator 344 will go to H level, whereas in the event that the sensor output SSA is lower than the second voltage V2, the output RECAn of the second voltage comparator 346 will go to H level. The intervals for which these regeneration control signals RECAp, RECAn are at H level is adjusted by the CPU 400, through adjustment of the variable resistance.

In preferred practice, the intervals for which these regeneration control signals RECAp, RECAn are at H level will be established at intervals symmetric about the peak of the sensor output waveform (this is substantially equivalent to the back electromotive force waveform). By so doing it will be possible to efficiently recover power from the coils.

FIGS. 18A through 18C illustrate sensor output and regenerative electric power during regeneration. FIG. 18A shows the sensor output SSA of the Phase A sensor 40A and the sensor output SSB of the Phase B sensor 40B; FIG. 18B shown the simulated Phase C sensor signal synthesized from the two sensor outputs SSA, SSB.

FIG. 18A also shows values of the two terminal voltages V1, V2 (FIG. 17B) that have been set by the regeneration control signal generator 340. FIG. 18C shows regenerative electric power that is regenerated according to the settings of these two terminal voltages V1, V2. The output regenerative electric power signals RECp, RECn (FIGS. 16A, 16B) are derived through synthesis of these regenerative electric power signals for the three phases.

According to the regeneration control circuit in the embodiment discussed above, since a magnetic sensor output for one phase is generated from the outputs of the installed magnetic sensors of the other two phases and regeneration control signals are generated using the sensor outputs of these three phases, the phases of the three phase regeneration control signals can be easily matched. As a result, it is possible to carry out regeneration more efficiently.

D. Other Embodiments

Figure 19A:
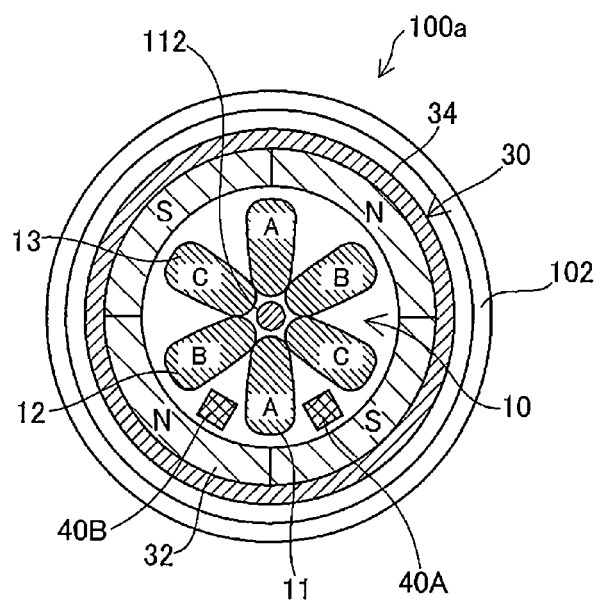
FIGS. 19A and 19B are sectional views of another configuration of a motor unit.
Figure 19B:
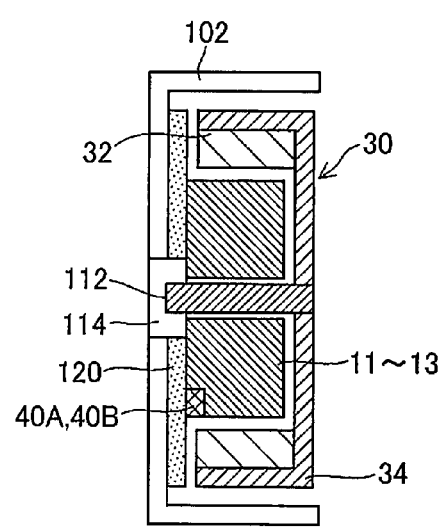

FIGS. 19A and 19B are sectional views of the configuration of the motor unit of a brushless motor in another embodiment. The stator portion 10 and rotor portion 30 of this motor unit 100a are each of generally cylindrical shape, with the rotor portion 30 encircling the perimeter of the stator portion 10.

As will be understood from this example, various shapes are possible as the mechanical shape of the brushless motor of the present invention. The present invention is not limited to three phase, four pole motors, and is applicable to brushless motors having any number of phases and poles.

Figure 20:
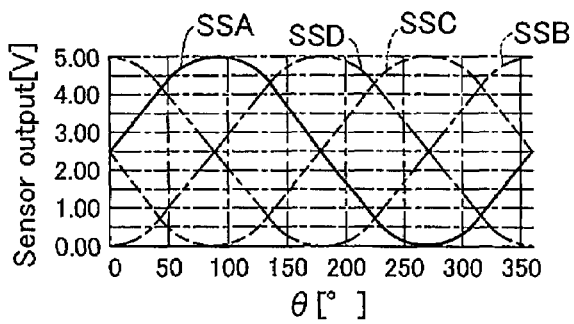
FIG. 20 depicts a method of computing a simulated sensor output in a four phase brushless motor in another embodiment of the present invention.

FIG. 20 depicts a method of computing a simulated sensor output in a four phase brushless motor, by way of yet another embodiment of the present invention. The mechanical structure of the four phase brushless motor has been omitted from the drawing. In a four phase brushless motor, the Phase C sensor output and the Phase D sensor output will be calculated according to the following computational expressions.

$$SSC = -(SSA - (VDD/2)) + (VDD/2)$$
$$= -SSA + VDD$$
$$SSD = -(SSB - (VDD/2)) + (VDD/2)$$
$$= -SSB + VDD$$

Typically, interrelationships among m magnetic sensors for m phase magnet coil groups, where m is an integer equal to 3 or greater, will be represented by some function (e.g. a trigonometric function). Consequently, even where magnetic sensors are installed for only n phases out of the m phases, where n is an integer equal to 2 or greater but less than m, it will be possible to derive simulated sensor outputs for the (m−n) phases lacking magnetic sensors through computations with the n phase magnetic sensor outputs as a variable. In preferred practice, the (m−n) phase simulated sensor outputs will each be generated using one or more, preferably two or more, of the n sensor outputs. For example, in the case of a three phase motor as described in Embodiment 1, the remaining phase sensor output will not be uniquely determined with only one of the two phase sensor outputs; it is only possible to determine the remaining phase sensor output by using both of the two sensor outputs.

In this way, the present invention is adapted to generating regeneration control signals (or drive signals) for m (m is an integer equal to 3 or greater) phase coil groups from the outputs of n (n is an integer equal to 2 or greater but less than m) phase magnetic sensors, in an arrangement having n magnetic sensors installed in association with n phase magnet coil groups out of the m phase magnet coil groups. The present invention is furthermore adapted to generating (m−n) sets of regeneration control signals (or drive signals) for (m−n) phase magnet coil groups lacking magnetic sensors, generating each from one or more of the sensor outputs of the n installed magnetic sensors.

D. MODIFICATION EXAMPLES

The present invention is not limited to the embodiments described hereinabove, and may be reduced to practice in various other ways without departing from the spirit thereof. Modifications such as the following would be possible, for example.

D1. Modification Example 1

While analog magnetic sensors are employed in the preceding embodiments, it is possible to use digital magnetic sensors having multivalue analog output, instead of analog magnetic sensors. Like analog magnetic sensors, digital magnetic sensors having multivalue analog output also have an output signal that changes in analog fashion. Herein, an "output signal that changes in analog fashion" refers in the broad sense to include both analog output signals, and multilevel digital output signals having three or more levels, not to On/Off binary output.

D2. Modification Example 2

It is possible to employ as the PWM unit various circuit configurations besides that shown in FIG. 9A. For example, it is possible to use a circuit that performs PWM control by comparing sensor output with a triangular reference wave. It is also possible to generate drive signals by some method besides PWM control. Circuits that generate drive signals by some method besides PWM control may be employed as well. For example, a circuit that amplifies sensor output and generates analog drive signals may be employed.

D3. Modification Example 3

In the preceding embodiments, simulated sensor outputs are generated for particular phases that lacks magnetic sensors, and these are used to generate regeneration control signals (or drive signals) for the particular phases; however, regeneration control signals (or drive signals) for particular phases lacking magnetic sensors may be generated by some other method instead. For example, it is acceptable to generate regeneration control signals (or drive signals) for n phases equipped with magnetic sensors, and to then use these n phase regeneration control signals (or drive signals) to generate regeneration control signals (or drive signals) for (m−n) phases lacking magnetic sensors.

D4. Modification Example 4

The present invention is applicable to motors of devices of various kinds such as fan motors, clocks (for driving the clock hands), drum type washing machines (single rotation), jet coasters, vibrating motors, moving bodies and the like.

Figure 21:
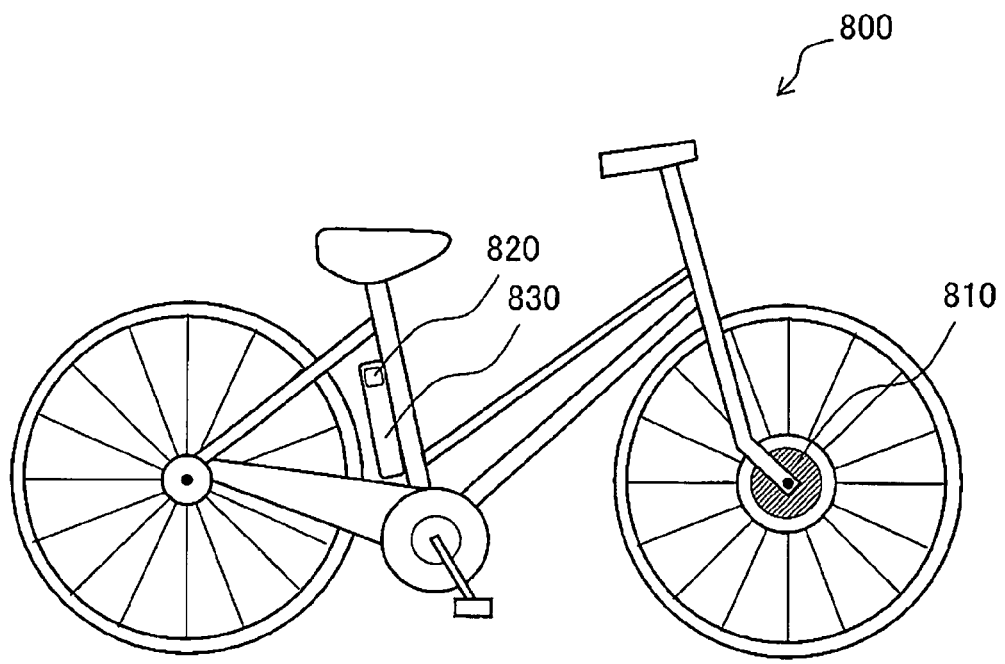
FIG. 21 illustrates an electric bicycle (electric-assisted bicycle) utilizing a motor according to the present invention.

FIG. 21 illustrates an electric bicycle (electric-assisted bicycle) as an example of a moving body utilizing a motor according to the present invention. The bicycle 800 includes a motor 810 at the front wheel, and a control circuit 820 and a rechargeable battery 830 both attached on the frame under the saddle. The motor 810 powered by the battery 830 drives the front wheel to assist the run. During braking, the regenerated power by the motor 810 is charged in the battery 830. The control circuit 820 controls the drive and regeneration of the motor 810. Various brushless motors described above can be used as the motor 810.

What is claimed is:

1. A brushless generator comprising:
   a coil array having m phase magnet coil groups, where m is an integer equal to 3 or greater;
   a magnet array having a plurality of permanent magnets;
   n magnetic sensors associated with n phase magnet coil groups among the m phase magnet coil groups, where n is an integer equal to 2 or greater but less than m, wherein the n magnetic sensors are used for detecting relative position of the magnet array and the coil array; and
   a regeneration control circuit that utilizes the sensor outputs of the n magnetic sensors to regenerate power from the coil array;
   wherein the regeneration control circuit includes:
      a rectifier circuit for regenerating power from the coil array; and
      a regeneration control signal generator for generating a regeneration control signal that controls the rectifier circuit,
   wherein the regeneration control signal generator:
      generates n sets of regeneration control signals for the n phase magnet coil groups associated with the n magnetic sensors using the respective sensor outputs of the n magnetic sensors; and
      generates (m−n) sets of regeneration control signals for the (m−n) phase magnet coil groups not associated with the n magnetic sensors, using one or more of the sensor outputs of the n magnetic sensors in generation of each of the (m−n) sets of regeneration control signals.

2. The brushless generator according to claim 1, wherein the regeneration control circuit further includes:
   a simulated sensor output generator that, based on computation using one or more of the sensor outputs of the n magnetic sensors as a variable, generates (m−n) simulated sensor outputs for the (m−n) phase magnet coil groups not associated with the n magnetic sensors,
   wherein the regeneration control signal generator generates m sets of regeneration control signals for the m phase magnet coil groups, in response to m sensor outputs inclusive of the sensor outputs of the n magnetic sensors and the (m−n) simulated sensor outputs.

3. The brushless generator according to claim 2, wherein the simulated sensor output generator generates the (m−n) simulated sensor outputs for the (m−n) phase magnet coil groups not associated with the n magnetic sensors based on computation using two or more of the sensor outputs of the n magnetic sensors as variables.

4. The brushless generator according to claim 2, wherein the simulated sensor output generator generates the simulated sensor outputs through real time computation using the sensor outputs of the n magnetic sensors.

5. The brushless generator according to claim 2, wherein the simulated sensor output generator generates the simulated sensor outputs by using a lookup table that has the sensor outputs of the n magnetic sensors as input values and the simulated sensor outputs as output values.

6. The brushless generator according to claim 1, wherein the integer m is 3, and the integer n is 2.

7. The brushless generator according to claim 1, wherein the magnetic sensors are sensors that generate output signals exhibiting analog change depending on relative position of the magnet array and the coil array.

8. A moving body comprising the brushless generator according to claim 1.

* * * * *